United States Patent Office 3,513,618
Patented May 26, 1970

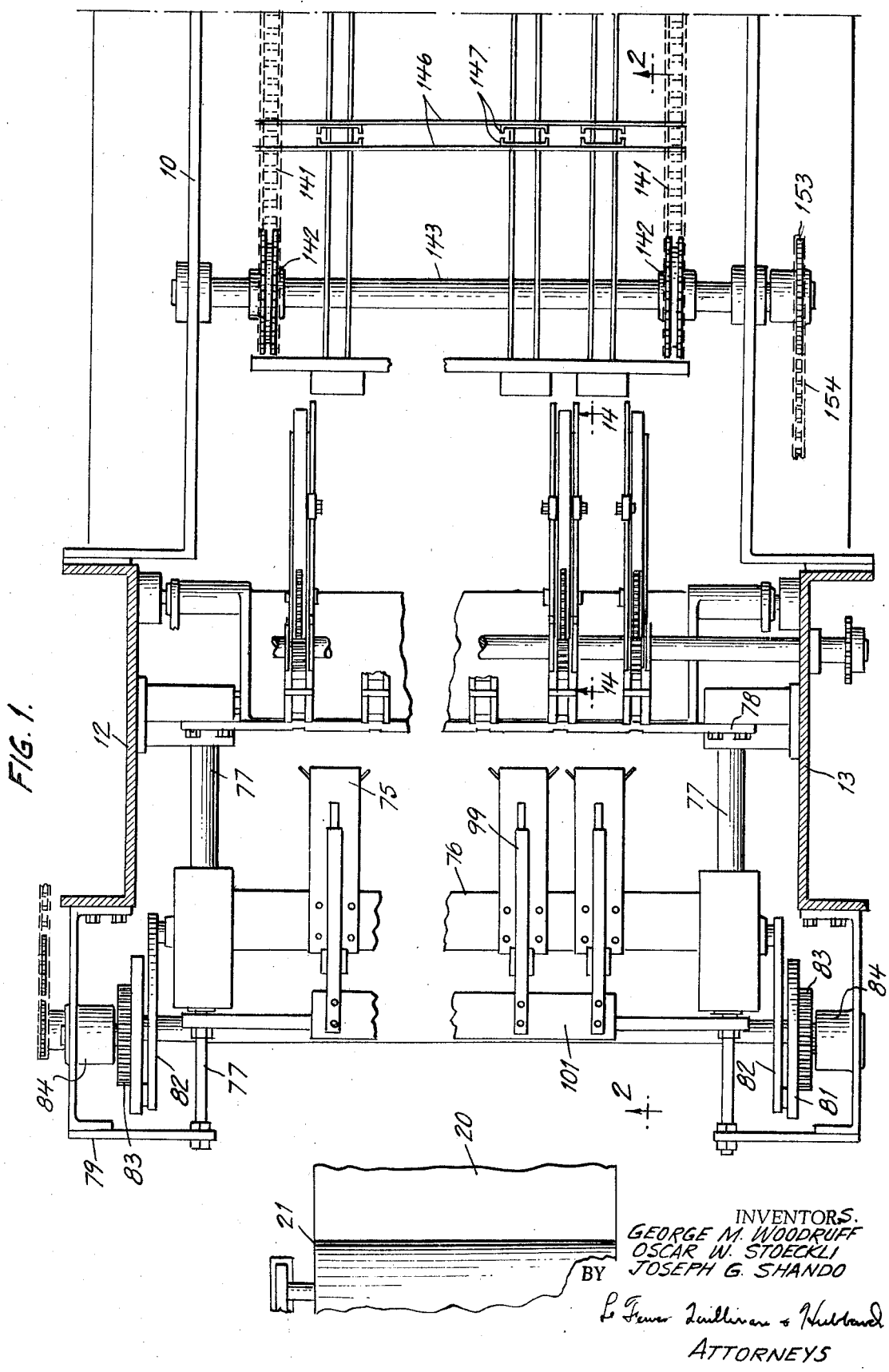

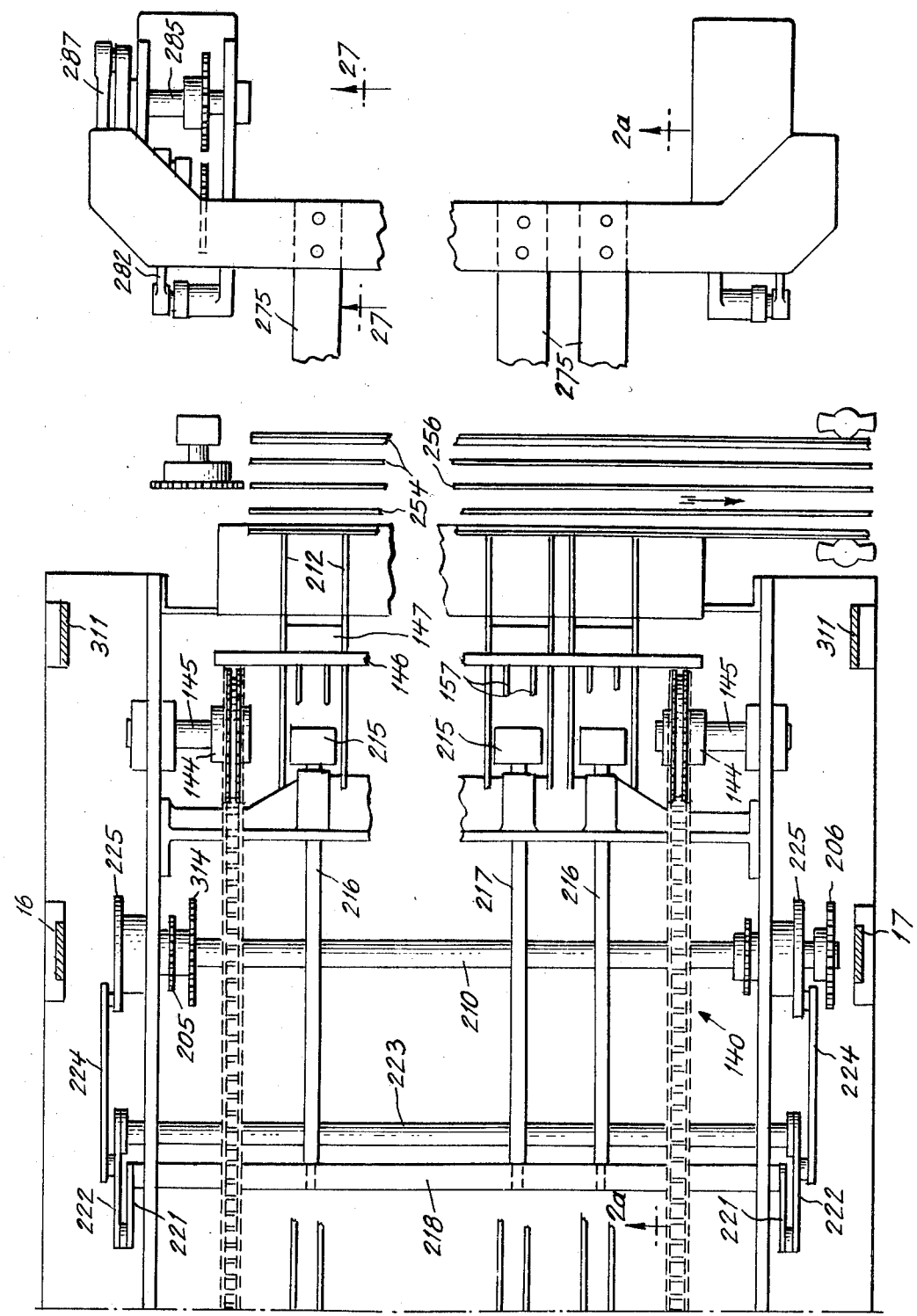

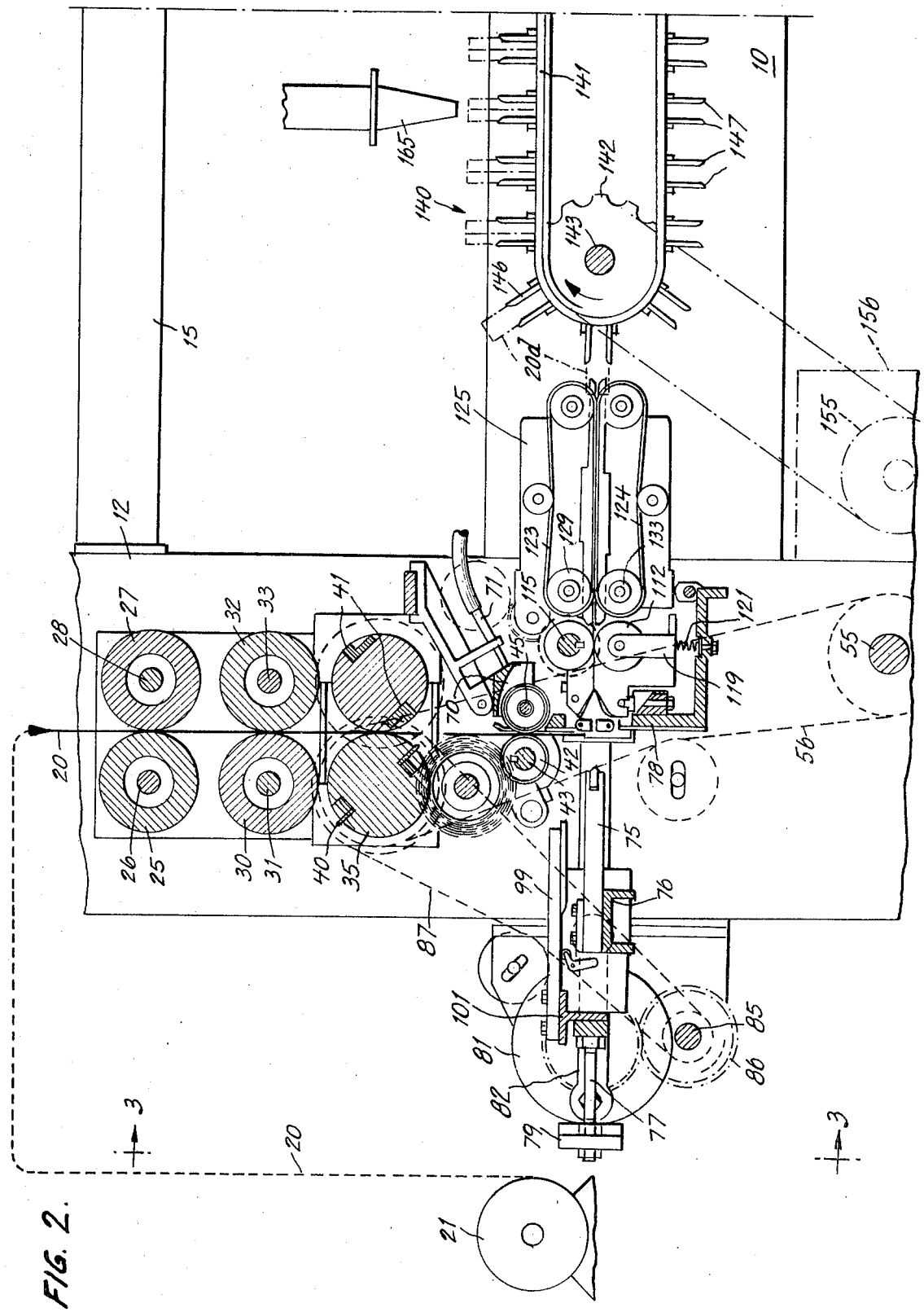

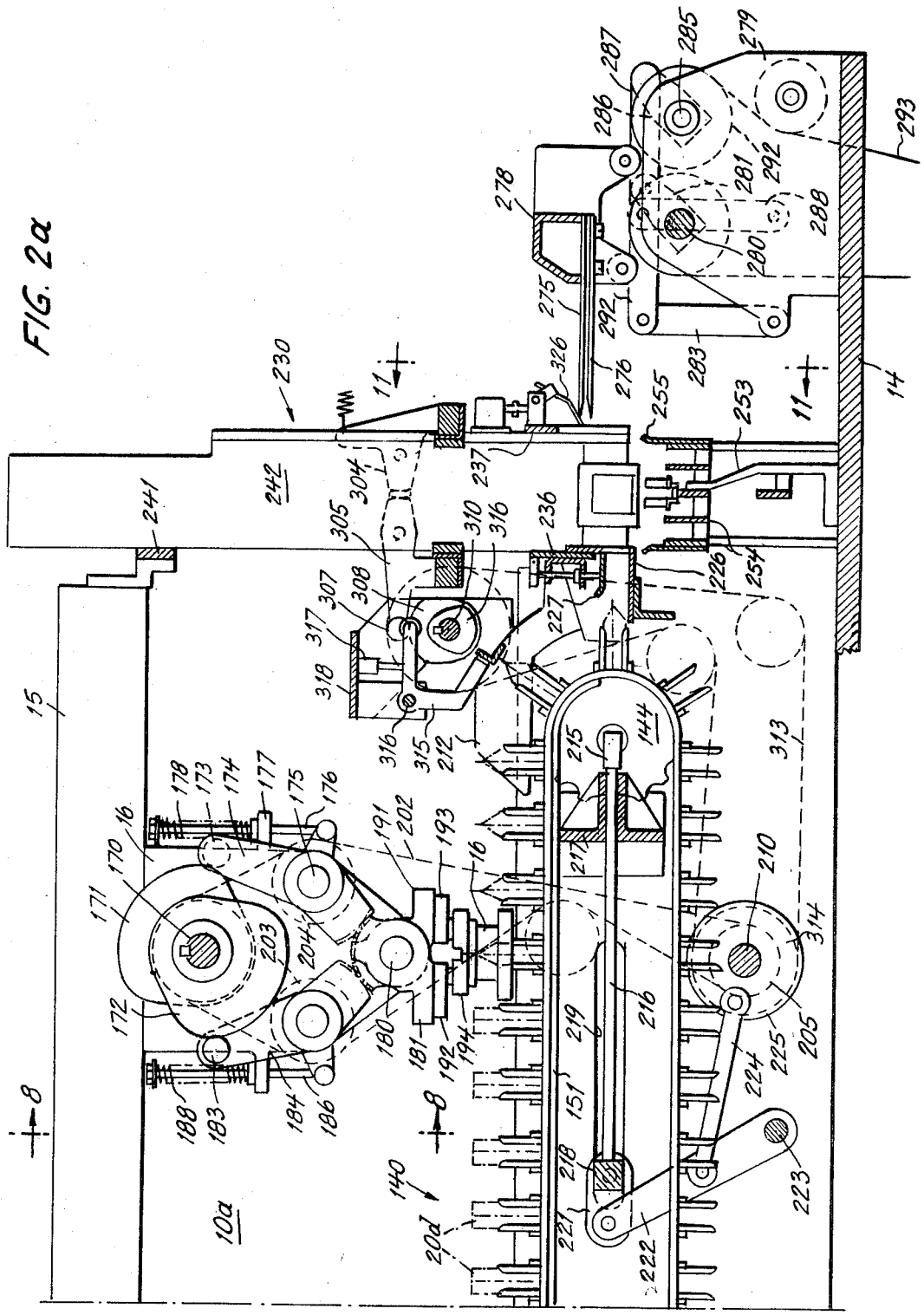

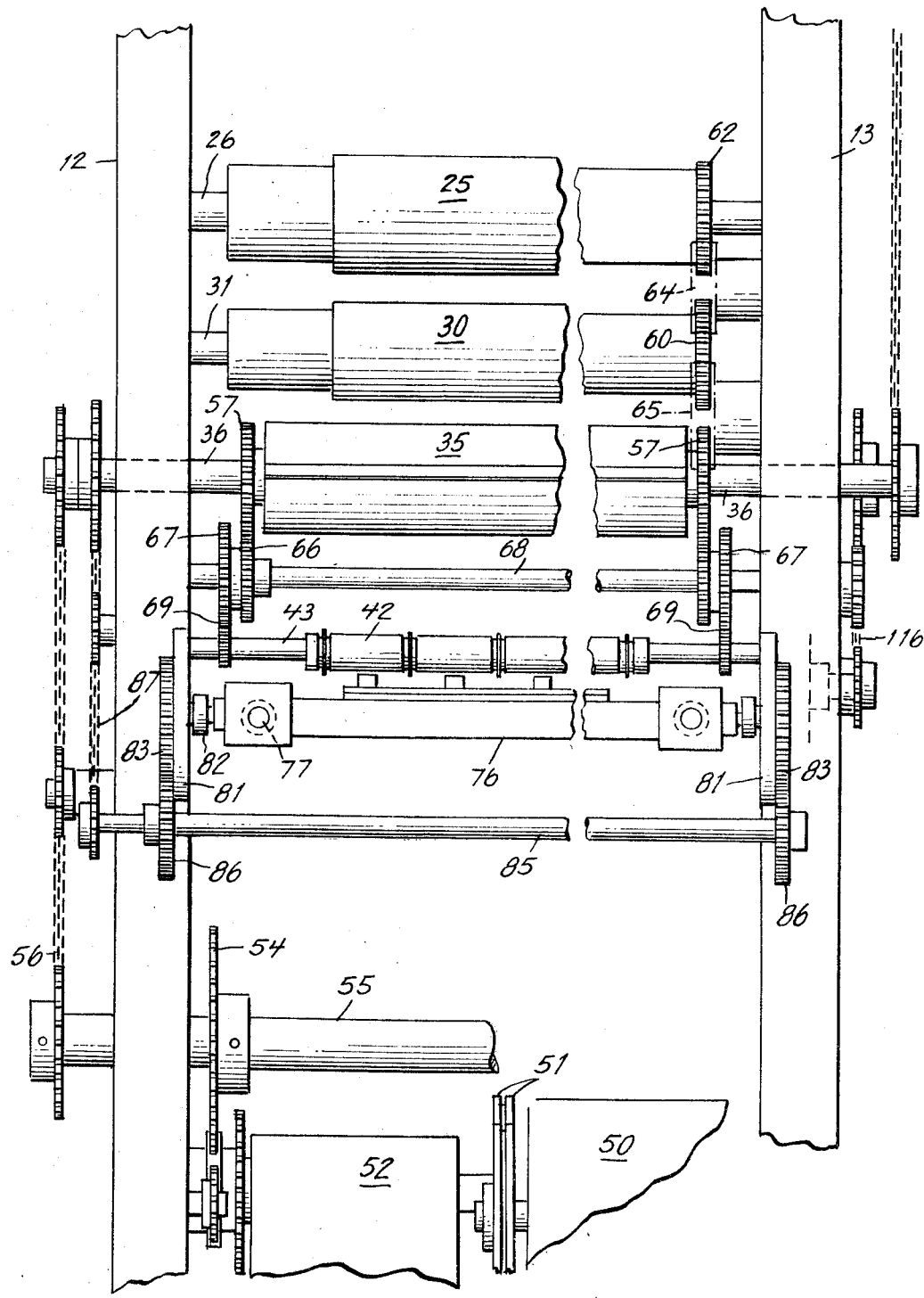

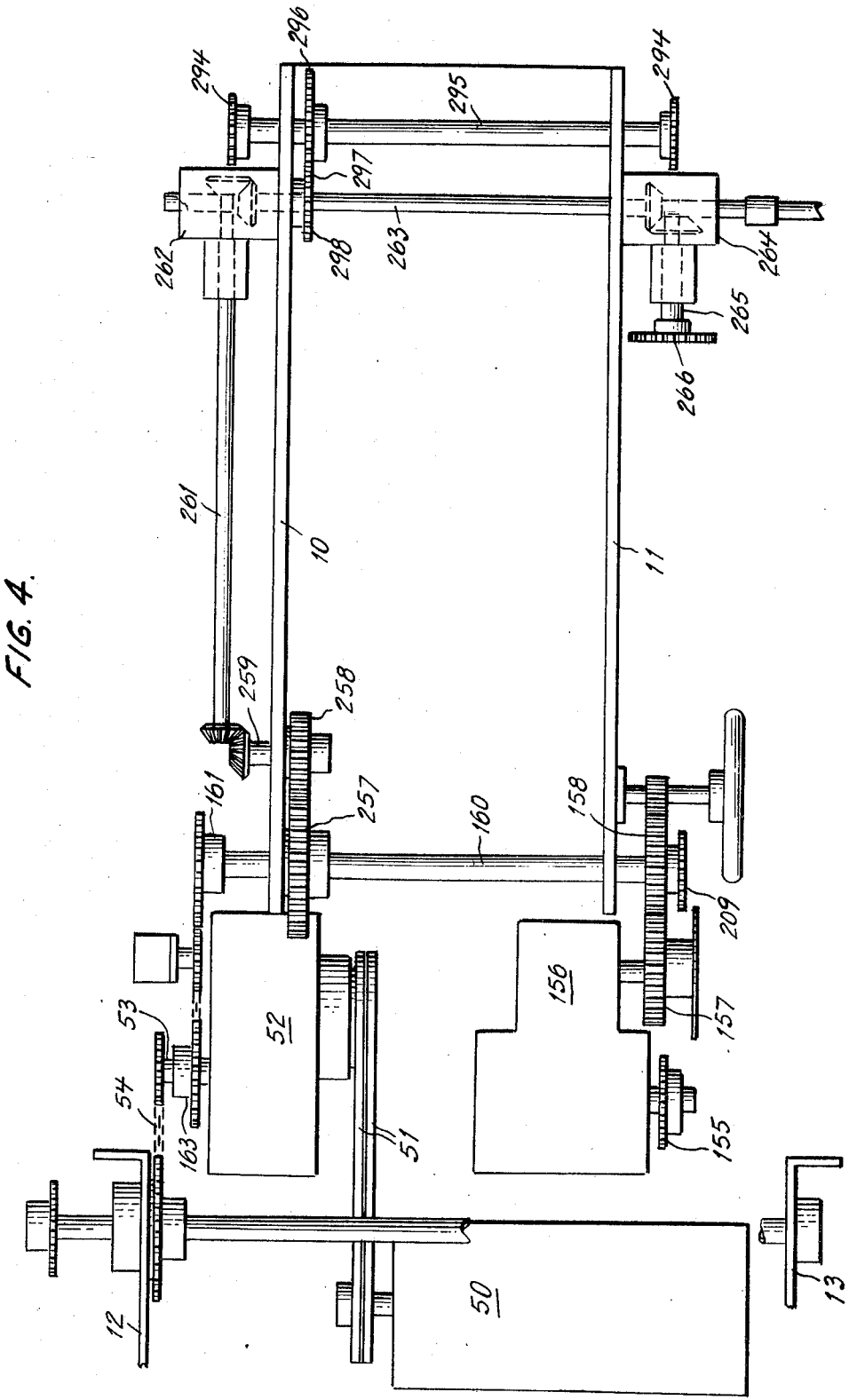

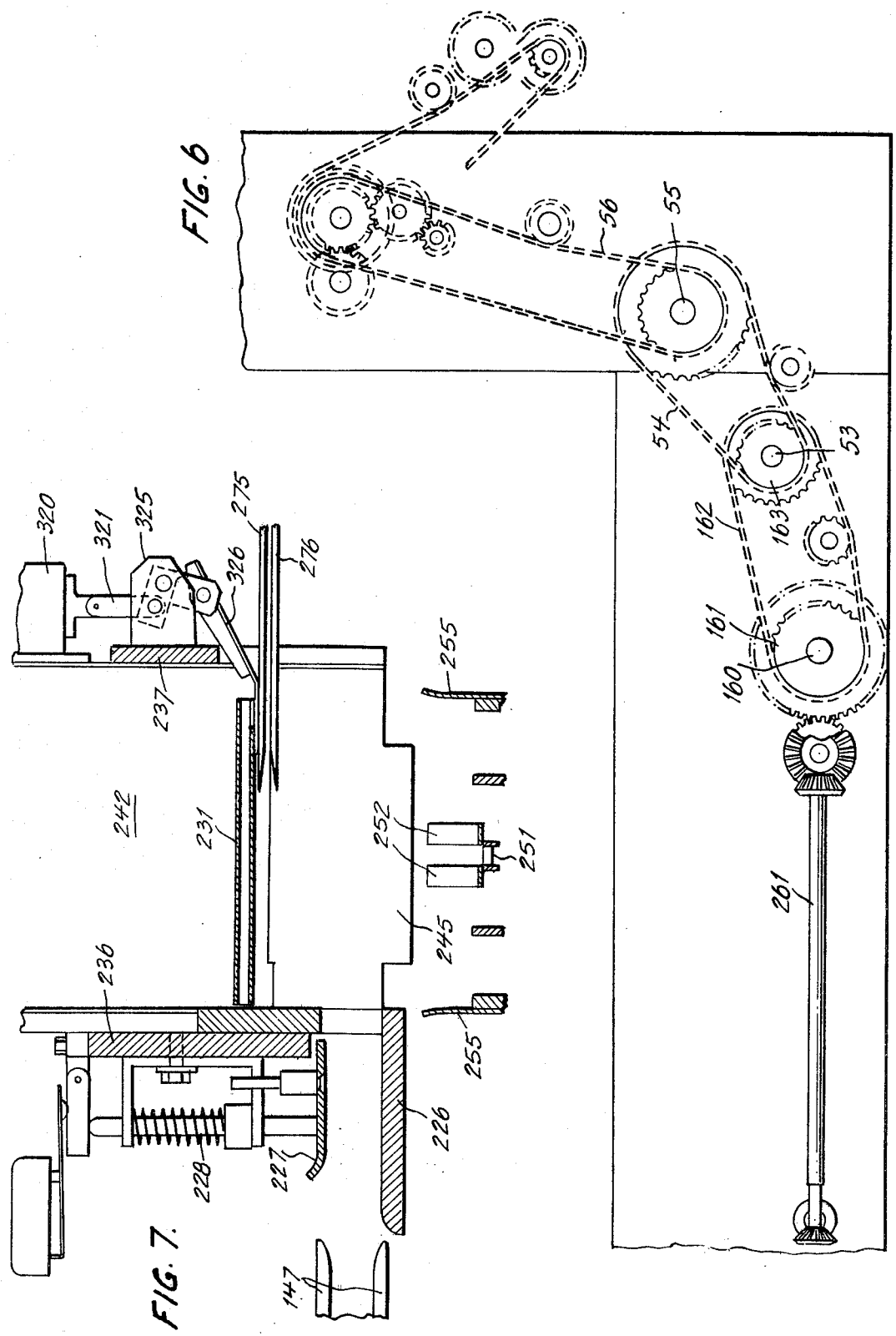

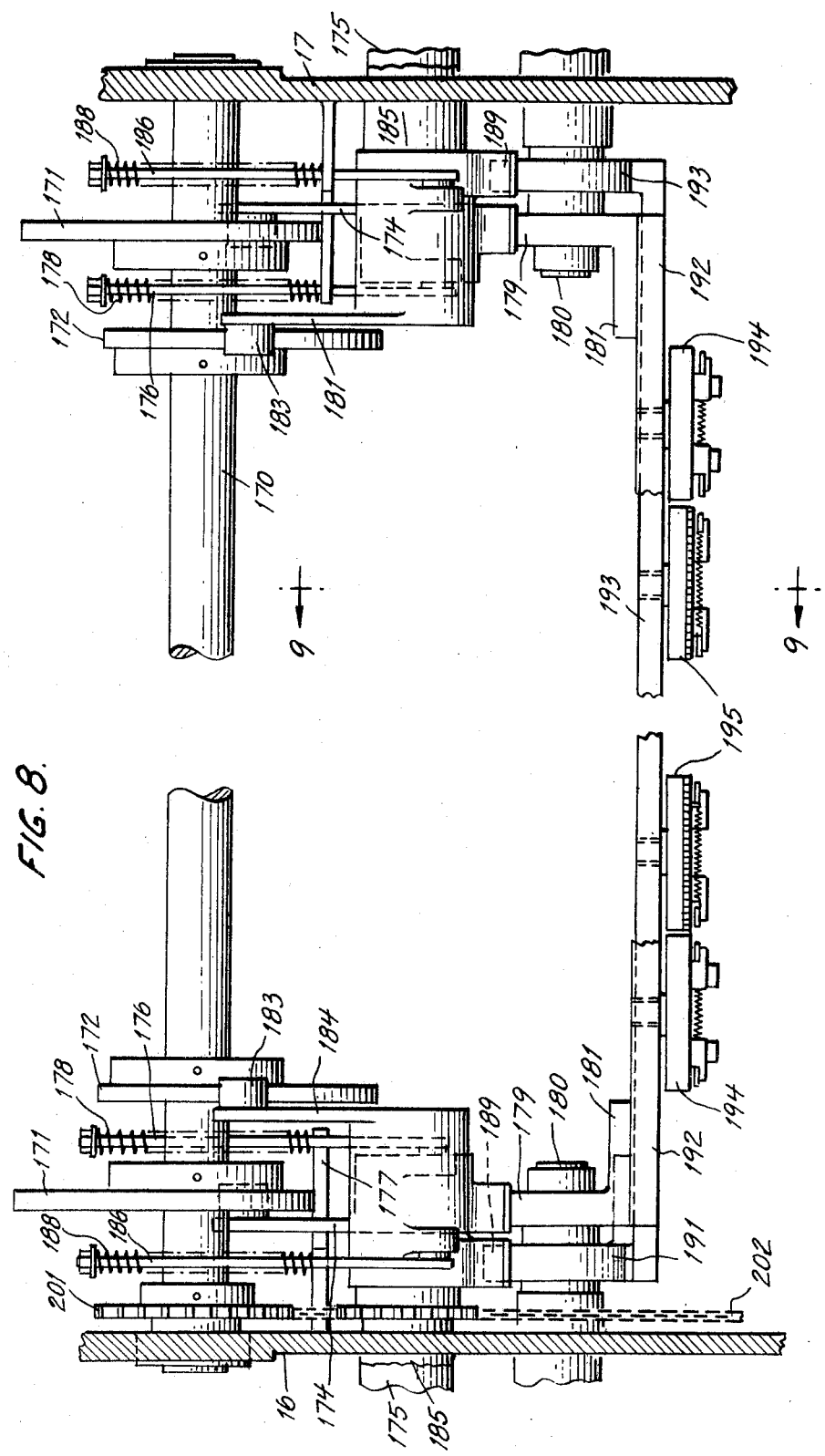

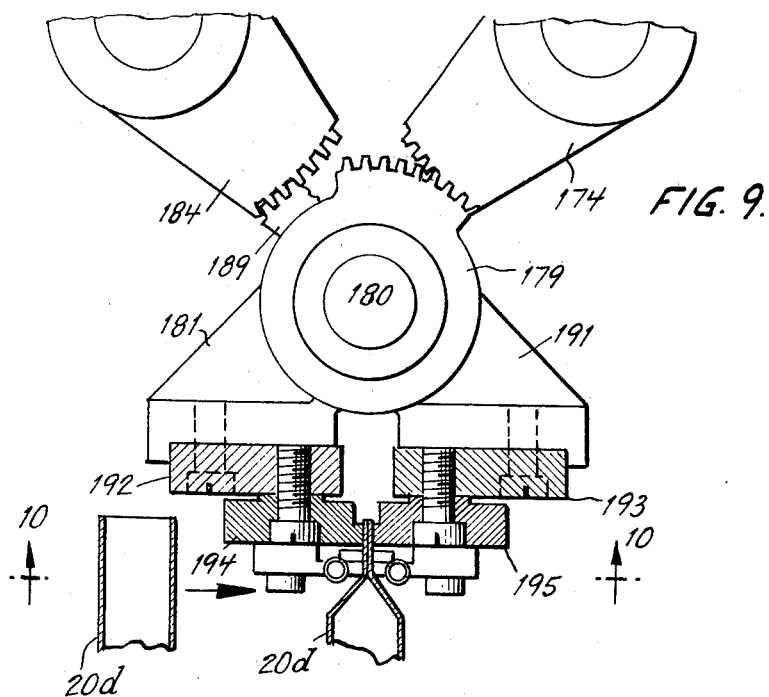
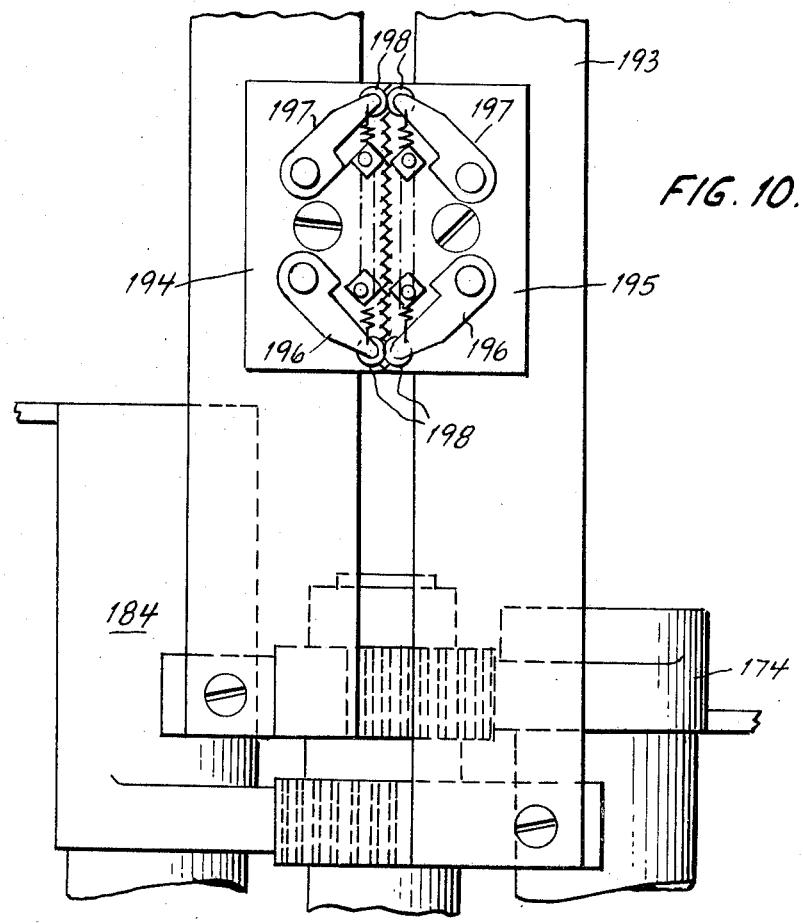

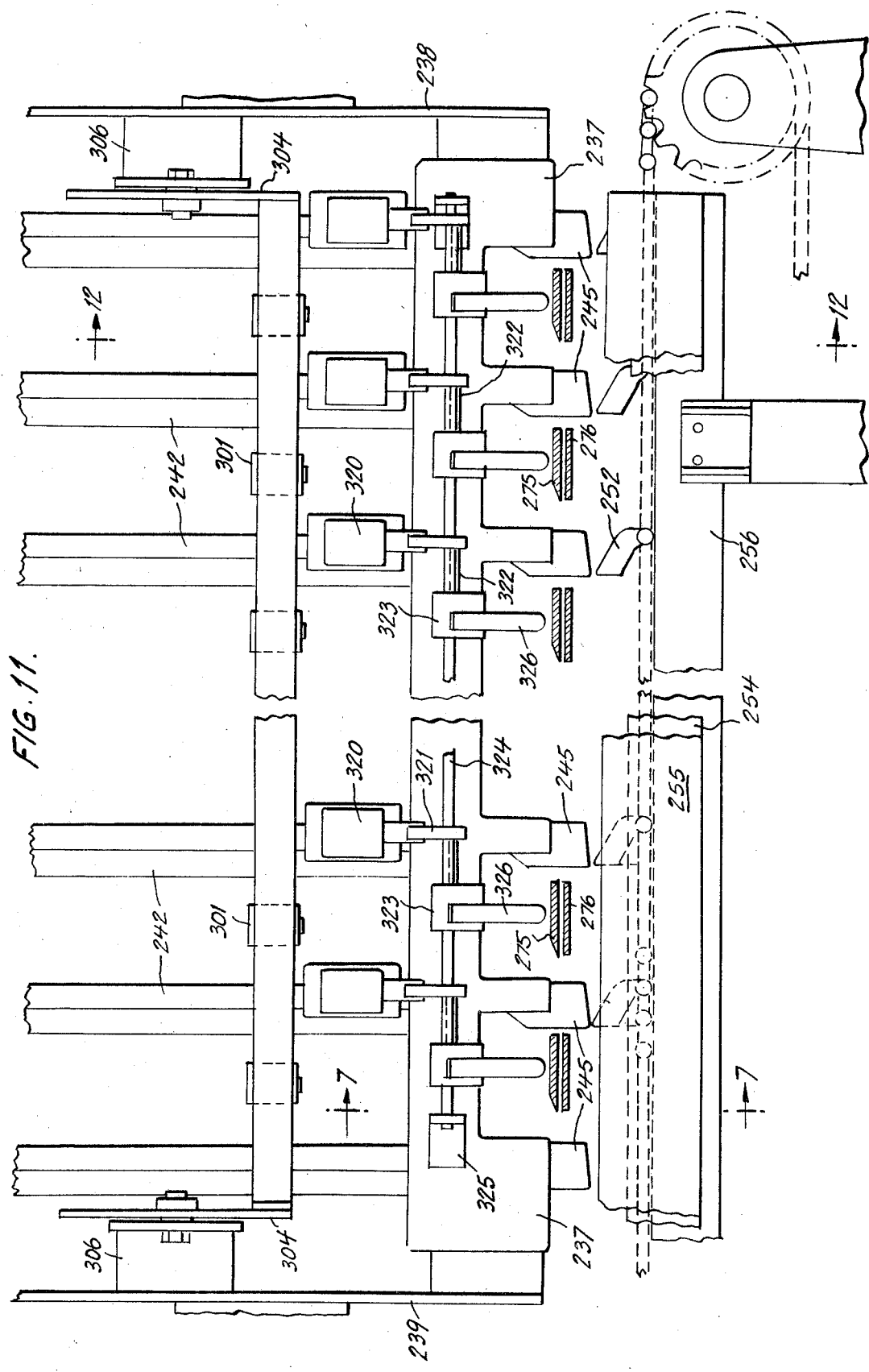

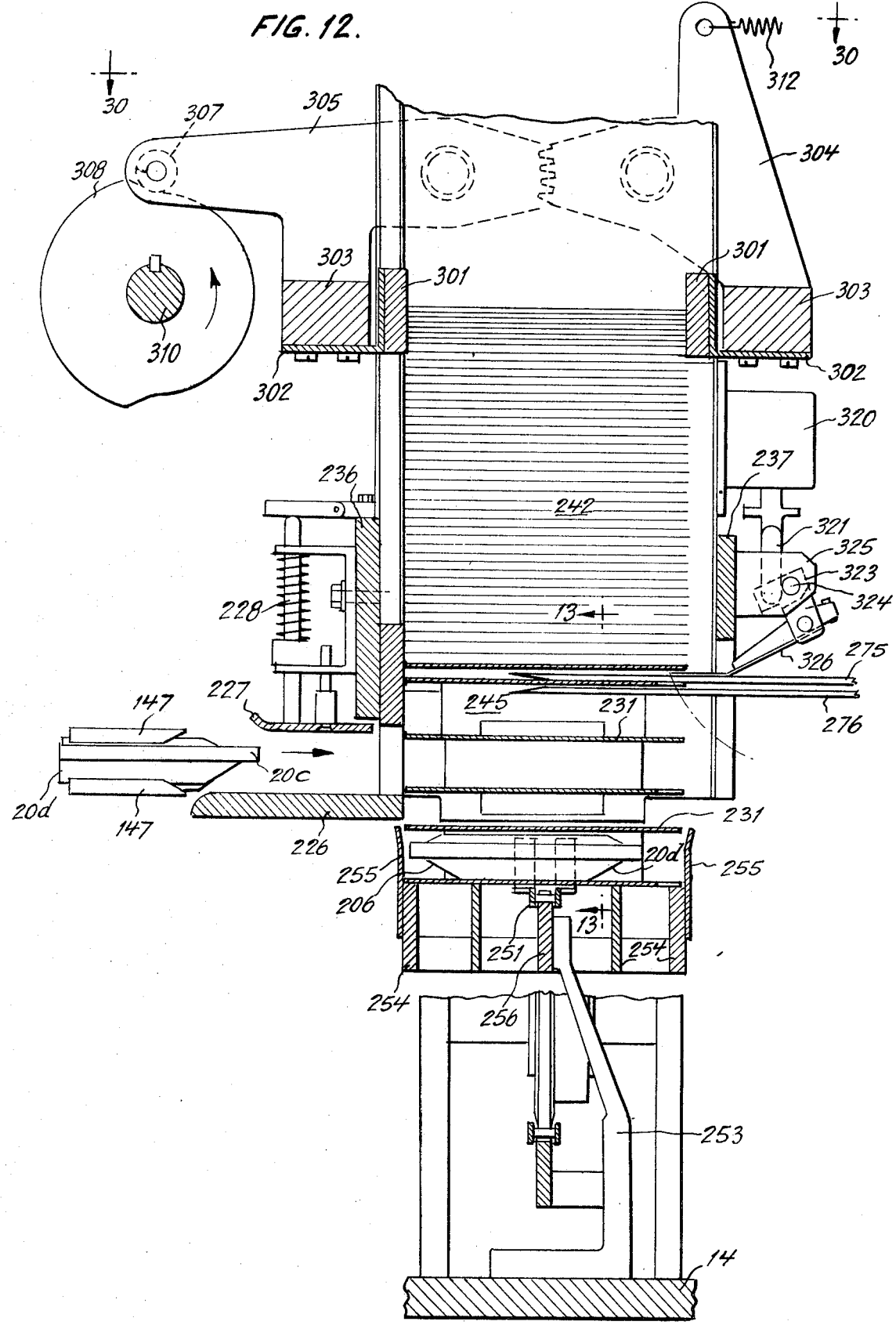

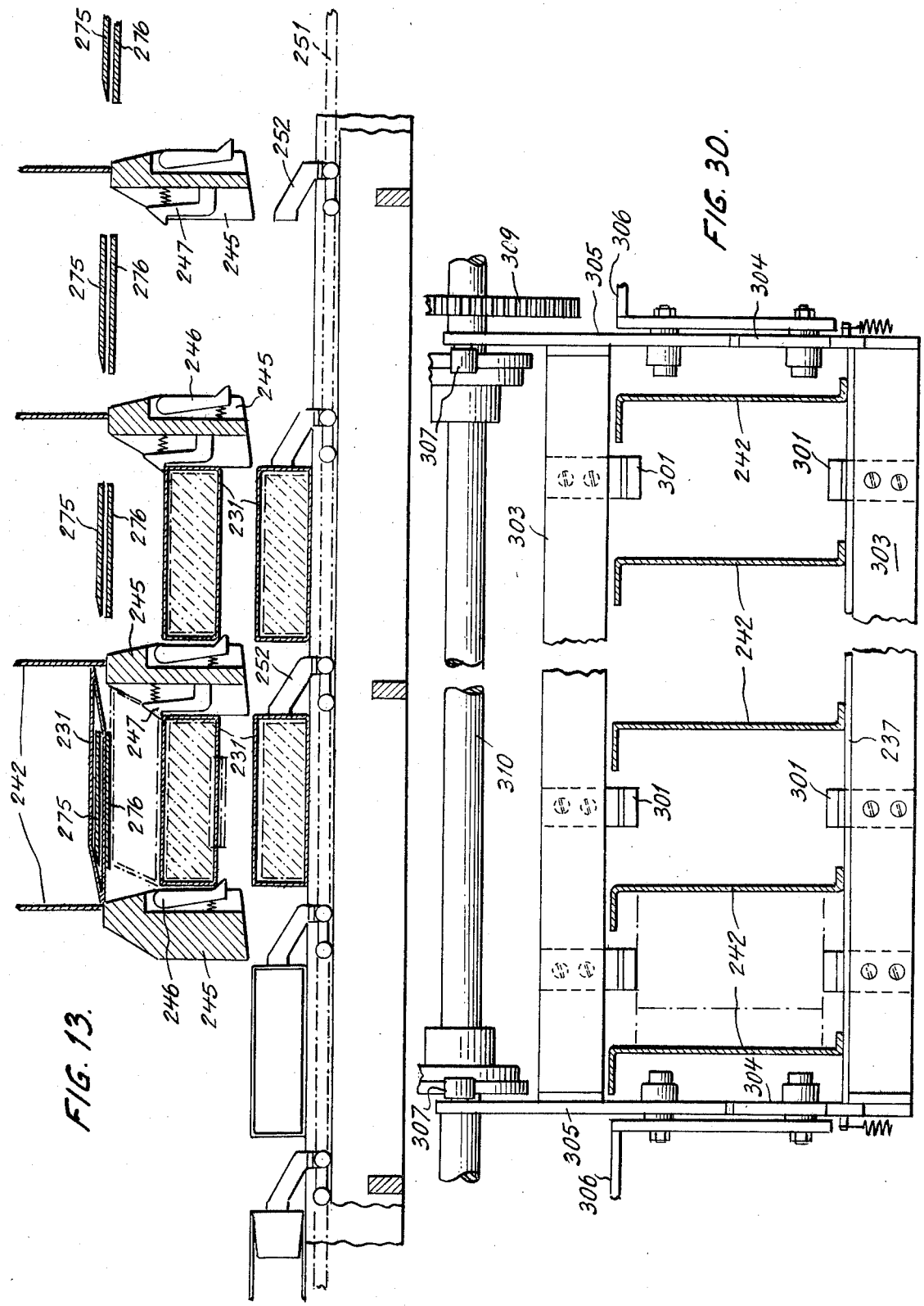

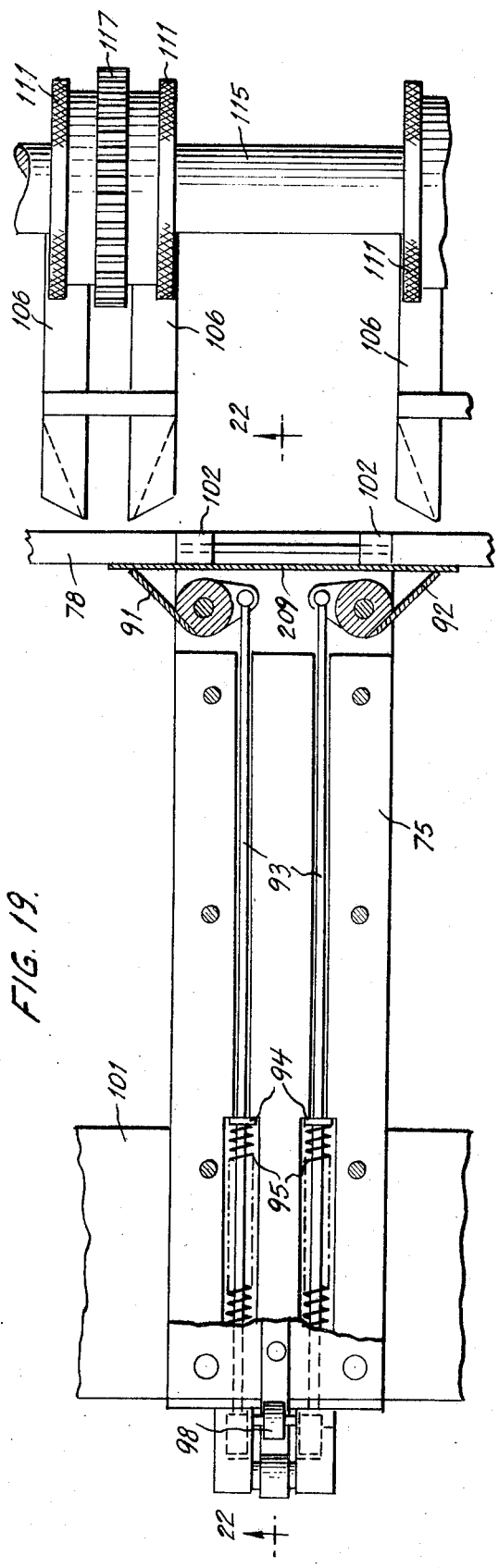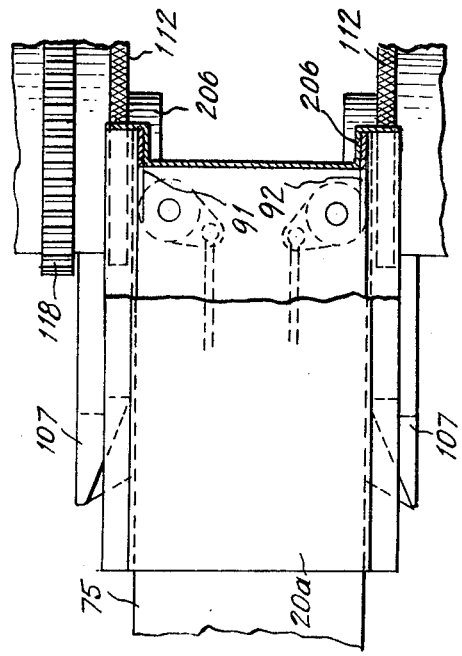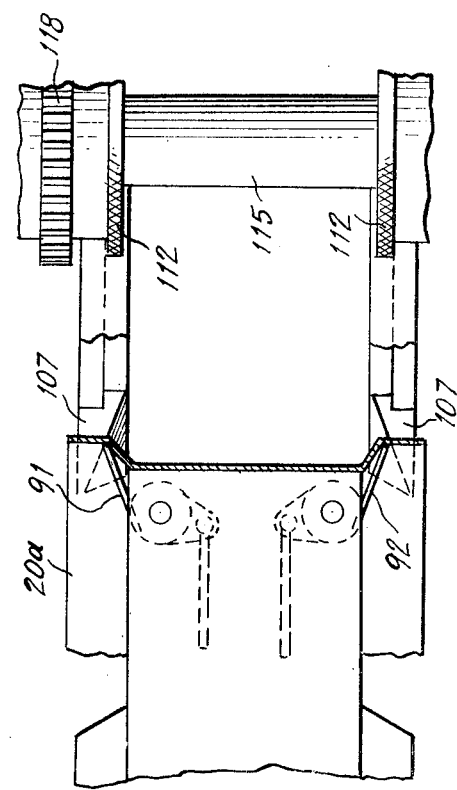

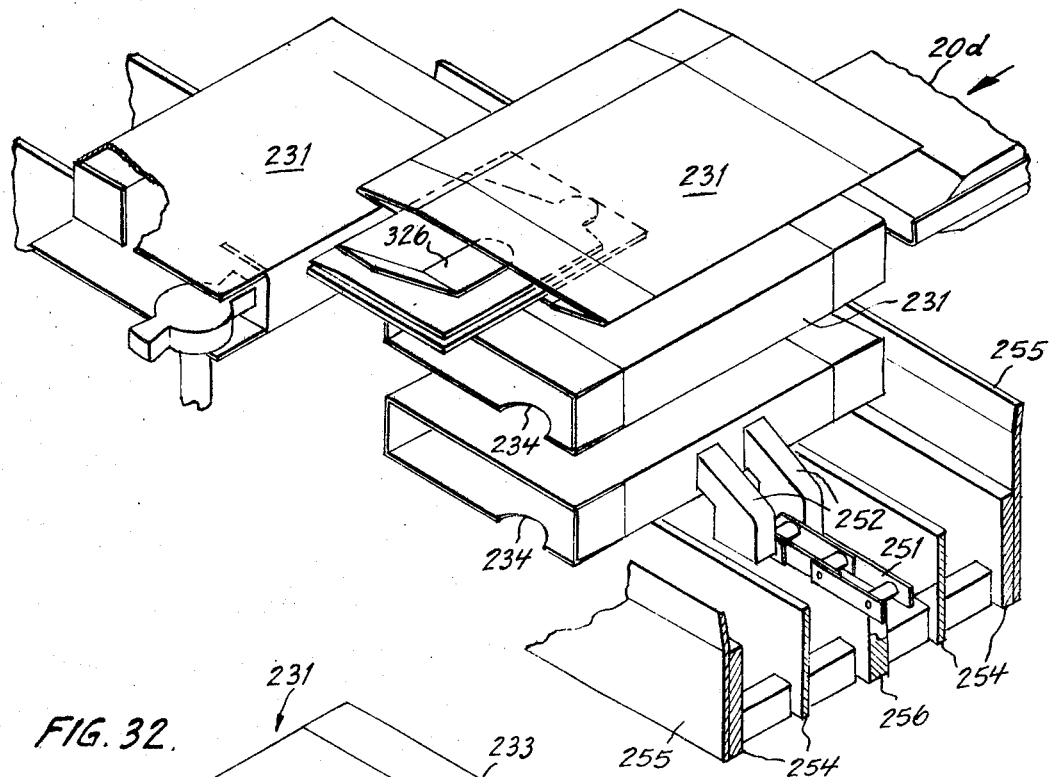
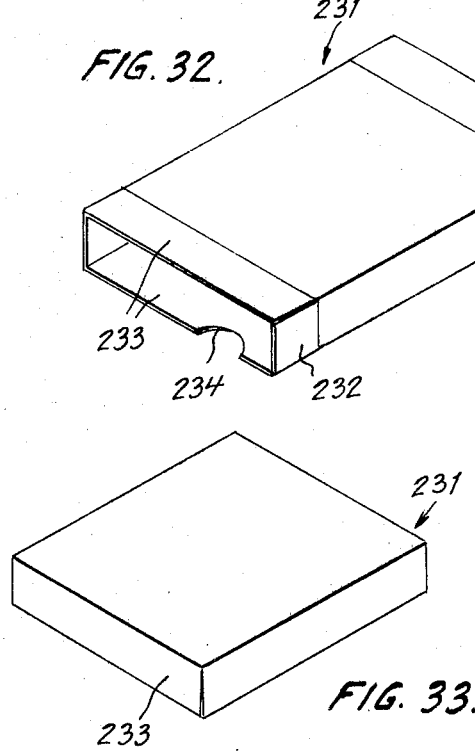
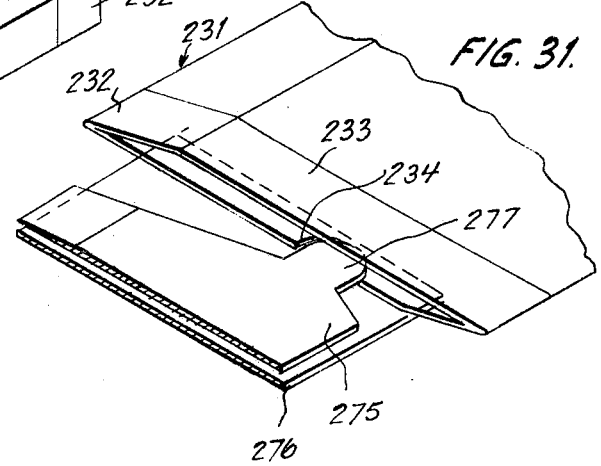
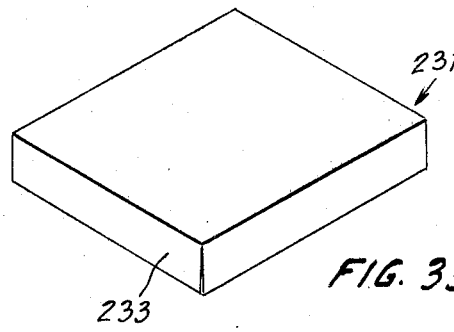

3,513,618
PACKAGING APPARATUS AND PROCESS
George M. Woodruff, Nyack, Oscar W. Stoeckli, Rye, N.Y., and Joseph G. Shando, Dover, Del., assignors to General Foods Corporation, White Plains, N.Y., a corporation of Delaware
Filed Jan. 19, 1967, Ser. No. 610,367
Int. Cl. B65b 41/13
U.S. Cl. 53—27                                              23 Claims

ABSTRACT OF THE DISCLOSURE

The apparatus and process forms, fills with product, seals, and inserts into cartons pouches or carton liners formed from blanks of sheet material severed from a single web of material and feed in parallel through the various processing stages. Each pouch-forming mechanism includes a rectangular forming plunger provided with tucking fingers operating to shape each pouch into a structure having a flat bottom, sides, and ends to result in a more densely packed carton, thereby minimizing the size of a carton required for a predetermined amount of product. This shaping of the pouch also provides sufficient clearance between the pouches of adjacent lanes as to enable multi-lane processing of blanks cut from a single web of pouch material supplying all of the several parallel lanes of the apparatus.

BACKGROUND OF THE INVENTION

This invention relates generally to an apparatus and method for forming, filling, sealing, and inserting pouches which may serve as carton liners. More particularly, the invention relates to apparatus and process of the above type operating simultaneously in a plurality of parallel lanes all supplied with blanks severed from a single web of pouch material, the pouches being shaped so as to have a flat bottom, sides, and ends to enable a more dense packing of the product-containing pouches in conventional rectangular-shaped cartons.

In the production of pouches of this character, which in this instance are intended to contain a granular or other free-flowing product, there are necessarily a number of operational steps to be performed in a certain predetermined sequence. These steps include (1) cutting a single web of pouch material or stock into blanks of the required size for forming into a pouch configuration, (2) forming the pouch into the desired configuration, but without sealing the top, so as to enable filling the pouch with the desired product; (3) filling the pouch with the desired product, (4) sealing the open top to completely contain the product within the pouch, and (5) inserting the filled pouch into its associated carton.

Each of the aforesaid functions or steps, of course, requires appropriate mechanisms or devices disposed at the proper stage of travel of the blanks through the apparatus for achieving the desired results, each said mechanism or device requiring a driving means operated from a suitable source of power. Conventional apparatus of this class is generally designed to produce pouches in a single series, and in installations where the production requirements of the user call for machine output in excess of that capable of being achieved by such a single-series apparatus, the production requirements can be met only by installation of additional single-series machines in sufficient numbers such as to meet the production requirements of the user.

In the machine according to the present invention, the desired higher production rate or output of pouches is achieved by designing the machine to simultaneously produce pouches in a plurality of series, the number of such series being a matter of choice and ordinarily specified in accordance with the production requirements of the user. The machine of the present invention may thus be considered a multi-lane machine, each lane being represented by that portion of the apparatus functioning to process a single series of pouches, as opposed to conventional apparatus or machines designed to produce only a single series of pouches and which thus may be referred to as single-lane machines. By employing the multi-lane concept, equipment with the desired production capacity can be produced at considerably less equipment cost than would be the cost of the necessary number of single-lane machines required to achieve the same production capacity. This follows from the fact that an equivalent number of single-lane machines would necessarily represent duplication of many of the parts, the duplication of which would not be required in a multi-lane machine, these being, for example, the means for driving the mechanisms or devices for performing the essential functions of the apparatus as above set forth.

FIELD OF THE INVENTION

Briefly stated, the machine of the instant invention is provided with means for withdrawing a web of packaging material, of a width sufficient to supply all the several lanes of the apparatus, from a supply roll of web material. After being withdrawn, the web material is severed both laterally and longitudinally to form a disconnected transverse series of rectangular blanks, one for each lane, which blanks are simultaneously accelerated and delivered to a pouch-forming station. At the pouch-forming station, reciprocally driven pouch-forming plungers, one for each lane, for rectangular cross section and operating in conjunction with folding plows, fold each blank into the shape of a gusset-type pouch, in which form it is transferred to sealing rolls which press the side edges of each pouch together, forming a butt-type seam. Associated with each forming plunger is a pair of tucking fingers effective for forming a gusset-type flap in the blank, as is required in pouches of this type to enable the side seam to be formed in a straight line along the side edges of the pouch without bunching of the material at the bottom of the pouch. The pouches thus formed from each blank are conveyed in a horizontal attitude to an intermittently driven carrier which turns the pouches to an upright attitude and advances them to filling stations, one for each lane, whereat a measured amount of product is dropped into each pouch through the open top thereof. Thereafter, the carrier delivers each filled pouch to a top-sealing station which completes the sealing of the product within the pouch. The carrier then returns the pouches of each lane to a horizontal attitude at an eject station, whereat eject plungers operate to eject each sealed and filled pouch from the carrier and to insert them into open-ended cartons which have been withdrawn from an associated carton magazine and disposed into position to receive the filled pouches from the carrier. The cartons, after receiving the pouches, are transferred to a continuously moving conveyor, and as the conveyor carries away the series of cartons thus delivered to it, the carton flaps are folded in and glued or otherwise adhered together, the carton conveyor delivering the filled and completely sealed cartons to whatever destination may be desired. Thus it will be seen that the machine operates on a web of packaging material continuously fed thereto to deliver filled and completely sealed cartons therefrom in a continuous manner, the intervening steps of formation of the web material into pouches or carton liners, the filling thereof, the sealing thereof, and the inserting thereof into cartons all being accomplished fully automatically, without requiring operator intervention and with each of the operations being accomplished simultaneously in each of the several lanes of the apparatus.

DESCRIPTION OF PRIOR ART

Included in the prior art are apparatus and methods of packaging operating on a multi-lane concept such as Pat. No. 2,881,574 to V. C. Wardell, issued Apr. 14, 1959; Pat. No. 2,295,335 to W. S. Cloud, issued Sept. 8, 1942; and Pat. No. 1,944,794 to F. Klinger, issued Jan. 23, 1934.

The latter patent is concerned only with a method of forming envelopes, not pouches of the gusset type, and is not concerned with the complete operation of filling the envelopes, sealing same or inserting same into associated cartons. Pat. No. 2,881,574 does not teach the formation of a gusset-type pouch but rather is concerned with the formation of product-containing envelopes. Pat. No. 2,295,335 is not concerned with the formation of web material into pouches or carton liners but is concerned only with the handling of partially formed pouches of the envelope type which are loaded into the machine and are thereafter conveyed through successive filling and sealing stages. Also included in the prior art is apparatus such as shown in Pat. No. 2,072,421 to A. O. Daller, issued Mar. 2, 1937, which shows the formation of a gusset-type pouch by means of a forming plunger operating on an individual pouch blank in cooperation with folding devices. The mechanism of this patent does not appear to be such as could be adopted for multi-lane operation and, moreover, the pouch construction is one having lapped, as opposed to butting, side beams. Overlapped seams on a pouch of this character has the disadvantage that it renders the pouch or liner less of a moisture barrier, due to the greater extent of edge wicking of moisture through an overlapped seam than is the case with butt-type seams.

SUMMARY OF THE INVENTION

The invention can be summarized by stating that it enables the complete packaging of a free-flowing product in lined cartons, starting with web material for formation into carton liners, and all in a continuous and completely automatic manner and capable of higher output speed and greater uniformity of packaging than has heretofore been possible. These results are achieved by designing the equipment at its various operating stages in such a manner as to enable simultaneous operation in a plurality of lanes with the total output of the machine being a function of the number of lanes employed.

It is therefore an object of this invention to improve upon apparatus for packaging a product in lined cartons.

It is a further object of the invention to enable the formation of gusset-type package liners from a supply of web material, the filling of said pouches, the sealing thereof, the inserting thereof into cartons, and the discharging of the cartons all in a continuous and fully automatic operation.

Another object of the invention is to improve upon means for opening in succession flattened cartons stacked in a carton magazine.

Further objects of the invention, together with the features contributing thereto and the advantages accruing therefrom, will be apparent from the following description when read in conjunction with the attached drawings, wherein:

FIGS. 1 and 1a, taken together, are a fragmentary plan view of the apparatus.

FIGS. 2 and 2a, taken together, are a view in side elevation taken from the right-hand side along the lines 2—2, 2a—2a, respectively, of FIGS. 1 and 1a.

FIG. 3 is an elevational view of the front end of the apparatus but from a point behind the supply spool of web material and along the line 3—3 of FIG. 2.

FIG. 4 is a fragmentary plan view illustrating the main drive shafts and gearing for the apparatus.

FIG. 6 is a view similar to FIG. 5 but taken from the left-hand side of the machine.

FIG. 7 is a sectional view in side elevation through one of the carton-supply magazines taken along the line 7—7 of FIG. 11.

FIG. 8 is a sectional view of the pouch top-seal mechanism taken along the line 8—8 of FIG. 2a.

FIG. 9 is a detailed section of the pouch top-seal mechanism taken along the line 9—9 of FIG. 8.

FIG. 10 is a bottom view of one of the pouch top-seal units taken from the line 10—10 of FIG. 9.

FIG. 11 is a view in elevation of the rear end of the apparatus, partially in section, taken along the line 11—11 of FIG. 2a.

FIG. 12 is a sectional view of one of the carton-supply magazines taken along line 12—12 of FIG. 11.

FIG. 13 is a sectional view of the carton-supply magazine structure taken along the line 13—13 of FIG. 12.

FIG. 19 is a plan view of one of the pouch-forming plungers and associated mechanism, said plunger being shown in a partly actuated position.

FIG. 20 is a plan view similar to FIG. 19 showing the plunger in a further actuated position.

FIG. 21 is a similar view showing the plunger in its fully actuated position.

FIG. 27 is a sectional view in side elevation illustrating the drive and linkage for the carton-opening mechanism and taken along the line 27—27 of FIG. 1a.

FIG. 29 is a perspective view illustrating the operation of the carton-opening mechanism in relation to the associated carton discharge conveyor.

FIG. 30 is a sectional view taken through the carton magazine structure along the line 30—30 of FIG. 12.

FIG. 31 is a perspective view illustrating the operation of the carton-opening blade in engaging the bottom-most carton of a carton stack contained within a magazine.

FIG. 32 is a perspective view of a carton after being withdrawn from the bottom of a carton stack and set-up or opened to receive a pouch therein.

FIG. 33 is a perspective view of a filled carton with the flaps folded in and adhered together.

DESCRIPTION OF THE PREFERRED EMBODIMENT

Figure 5:
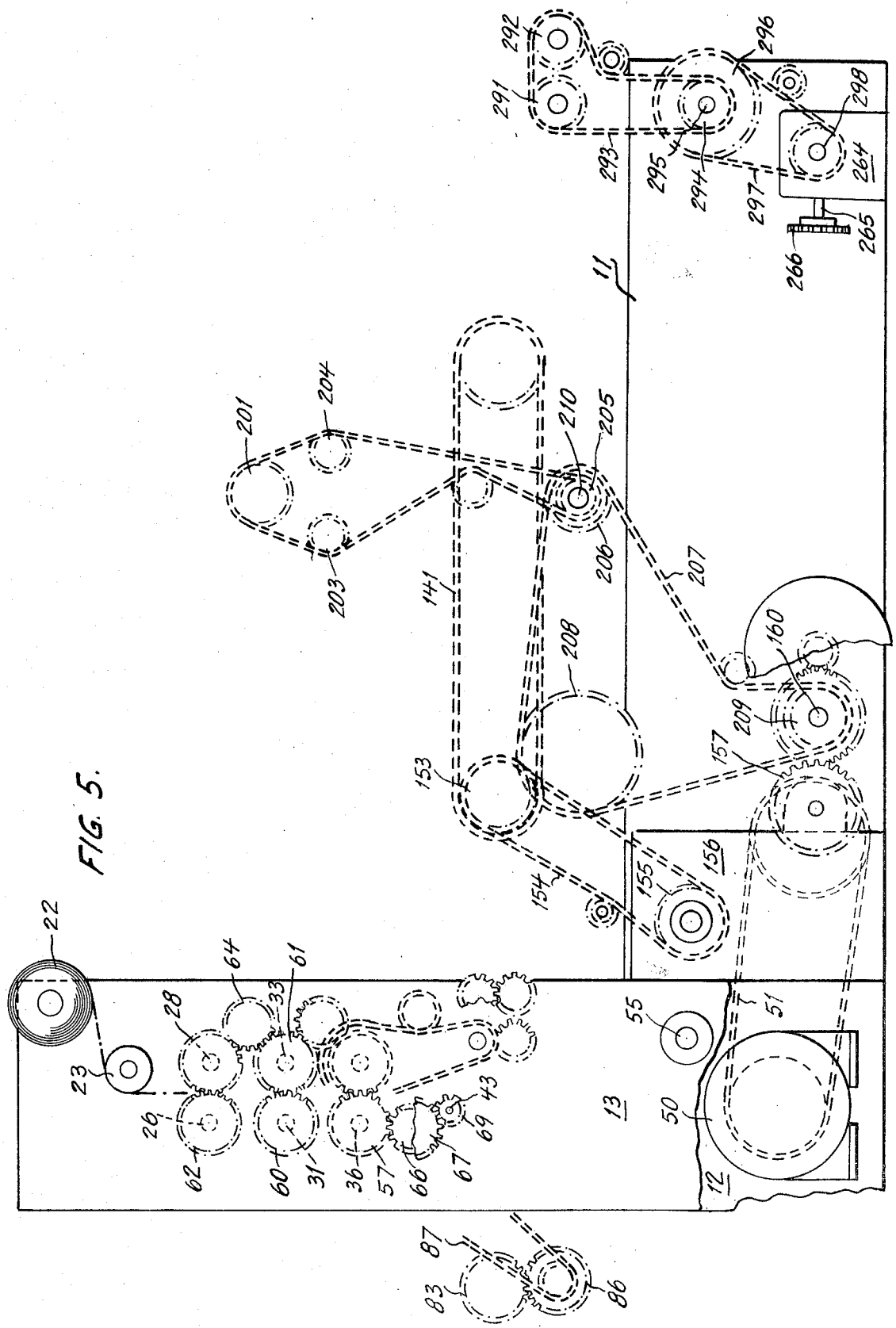
FIG. 5 is a fragmentary view in side elevation from the right-hand side illustrating part of the main drive train of the apparatus.
Figure 14:
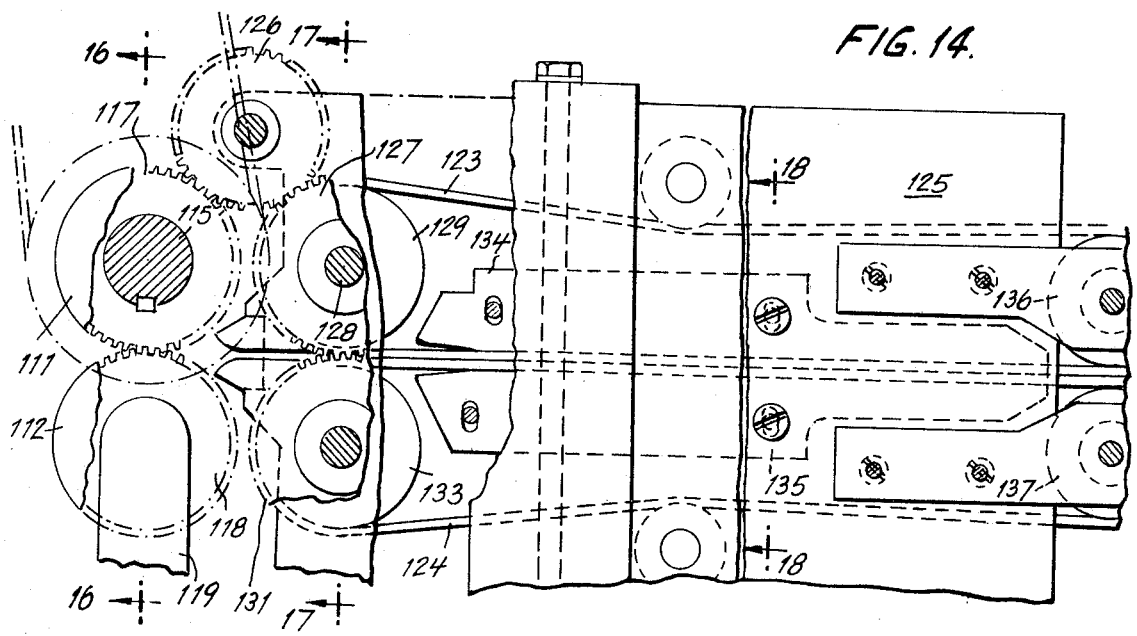
FIG. 14 is a sectional view in elevation of the pouch side-seal mechanism taken along line 14—14 of FIG. 1.
Figure 15:
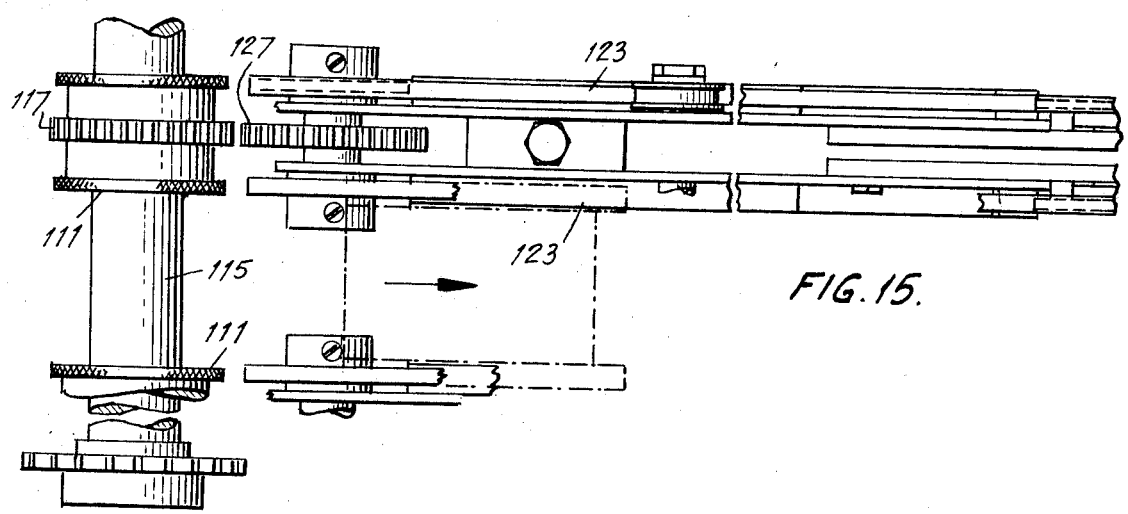
FIG. 15 is a plan view of the mechanism illustrated in FIG. 14.

Referring now to the drawing, and to FIGS. 1–5 thereof in particular, the apparatus is supported by framework which includes a left-hand main side frame 10 and a right-hand main side frame 11 which extend substantially the length of the machine, each of said frames constituting a vertically disposed metal plate, casting or the like, the lower portions of which are inwardly offset and serve to support the main drive shafts and gearing for the apparatus. Attached to said side frames at the front of the machine are vertically elongated left- and right-hand support frames 12, 13, respectively, which support the web-feeding rolls and related parts, and joined to said side frames 10, 11 at the rear end of the machine is a frame table 14 which supports the carton magazines and carton-opening mechanism along with related parts. Extending rearwardly from the upper portion of frames 12, 13 are rearwardly extending frame bars 15, one shown in FIGS. 2, 2a, which are supported near their rearward ends by frame plates 16, 17 secured to side frames 10, 11, respectively.

Web material 20 is fed to the apparatus from a supply spool 21 thereof carried by any suitable stand disposed at the front of the machine, the web material 20 being of a width sufficient to supply individual blanks of the web material to each of the several lanes of the apparatus. The web material may be of any suitable stock, depending upon the nature of the product with which it is to be used, and may be any one of various forms of paper or paper laminated and/or coated with foil or plastic material. In the present instance the apparatus is intended for use in packaging of a hygroscopic granular product, and for use with such a product web material, for forming into carton liners, comprised of glassine paper coated with polyethylene is considered to be a suitable stock for this purpose. The polyethylene coating enables the web material to be heat-sealed together in the pouch-forming stages of the machine's operation. However, web material not coated with a thermoplastic such as to permit heat-sealing techniques in the pouch-forming stages may be employed, in which case the web material could be printed in appropriate patterns with a hot-melt by conventional hot-melt applicator means not shown herein but which would be operative on the web material after leaving the supply spool 21. Of course, it should be understood that suitable web tensioning means and side edge registration means of conventional design may be employed while introducing the web to the apparatus, which means are not shown herein in order to avoid unnecessarily complicating the disclosure, since such means are not regarded as forming part of the inventive concepts herein disclosed.

The web material 20 is drawn around a rubber-coated pull roll 22 and thence around an idler roll 23, see FIG. 5, both mounted near the top of and between the side frames 12, 13. The web material then proceeds to a first pair of web feed rolls 25, 27, see FIG. 2, carried by shafts 26, 28, respectively, journaled in support frames 12, 13. From said first pair of web feed rolls, which are rubber-coated, the web proceeds to a second pair of web feed rolls 30, 32 mounted on shafts 31, 33, respectively, also journaled in the main support frames 12, 13. The two pairs of feed rolls are provided in the apparatus to render the apparatus adaptable for use with web material not having a thermoplastic or heat-sealable coating and wherein a hot-melt pattern would be printed on the web material prior to its introduction to the aforesaid feed rolls. In the latter instance, the rolls of the respective pairs would have recessed portions complementing one another to allow clearance for a hot-melt pattern on the web while permitting one or the other pair of rollers to maintain positive contact with the web material at all times.

From the second pair of feed rolls the web material proceeds to a pair of cut-off rolls 35, 37 carried by shafts 36, 38, respectively, also journaled in the support frames 12, 13. The rolls 35, 37 are spaced apart with a nip clearance to accommodate the thickness of the web material 20, the roll 35 being provided with diametrically opposed knife edge inserts 40 cooperating with diametrically opposed anvil inserts 41 provided on the roll 37. The cut- off rolls 35, 37 thus operate once each half revolution to sever a predetermined length of the web material from the supply thereof, the severed portion of the web material, however, at the time of severance, just being engaged for continued feed at the nip formed by a pair of web slitting rolls 42, 44 mounted on shafts 43, 45, respectively. Roll 44 is formed with a spaced series of circumferential knife edges, and roll 42 is formed with a corresponding series of anvil surfaces cooperating therewith, whereby the laterally severed section of web material is slit longitudinally by the rolls 42, 44 to separate the severed section of web material into a lateral series of separated rectangular blanks 20a, of which there is a separate one for each lane of the apparatus. The rolls 42, 44 are driven to have a surface velocity substantially greater than that of the preceding feed and cut-off rolls, preferably about twice the surface velocity, so as to accelerate the feed of the separate blanks downwardly and into the pouch-forming station of the apparatus. Since the present machine is one disclosed as having six parallel lanes, the rolls 42, 44 are provided with five anvils and cutting blades, respectively, effective for separating the severed section of web material into six separate blanks to be subsequently formed into pouches, the blanks being fed downwardly to a position wherein they are engaged by pouch-forming mechanism hereafter to be described.

The power source for driving the mechanism described comprises a motor 50, best seen in FIG. 4, suitably mounted in the lower portion of the support frames 12, 13, said motor driving a pair of V-belts 51 running to the input pulley of a reduction gear box 52. The output shaft 53 of the reduction gear box carries a sprocket driving a chain 54 running to a sprocket carried by a shaft 55 extending between and journaled in the side frame supports 12, 13. Also mounted on shaft 55 on the outer side of the frame support 12 is a sprocket driving a chain 56 running to a sprocket carried by the left-hand end of shaft 36, which shaft, as aforesaid, has mounted thereon the web cut-off roll 35. Shaft 36 carries near its right-hand end, see FIG. 5, a gear 57 intermeshing with a similar gear 58 on shaft 38 as can best be seen in FIG. 5. The feed roll shafts 31, 33 and 26, 28 are similarly provided with intermeshing gears 60, 61 and 62, 63, respectively. Idler gear 64 intermeshing with gears 63, 61 and idler gear 65 intermeshing with gears 61, 58 complete the train of gearing for driving the two pairs of feed rolls and the web cut-off rolls from the power source provided by the motor 50. The gear 57 has a counterpart gear 57 near the left-hand end of shaft 36, see FIG. 3, which gears 57 mesh with one of a pair of accelerating gears 66, 67 integral with one another and carried by a shaft 68, the gears 67 in turn meshing with gears 69 fast on shaft 43, which, as aforesaid, carries the acceleration and anvil roll 42. The knife-edge roll 44 is supported by a pivotally mounted bearing block 70 and is maintained in pressure contact with anvil roll 42 by pneumatically actuated plunger 71 connected to a line or hose extending to an appropriate supply of compressed air, not shown.

To summarize the foregoing, the mechanism just described operates to withdraw web material 20 from the supply spool 21 and to sever the web material laterally into sections which are thence slit longitudinally to create from the web material being supplied to the machine individual rectangular blanks 20a, each of which is advanced at an accelerated velocity relative to the velocity of the web materal before severance, said blanks being delivered to a position which may be referred to as the pouch-forming station to be operated upon by pouch-forming means now to be described.

Operating at the pouch-forming station of the apparatus are a plurality of plungers 75 reciprocally driven in unison along a horizontal plane, each effective in its own lane of the apparatus for engaging one of the respective blanks of web material delivered to the pouch-forming station along the center line thereof and urging each blank into operative relationship with blank-folding mechanism causing the blank to assume the contour of the forming plunger. The forming plungers are mounted on a crosshead 76, the ends of which are bored and slide-fitted on guides or bosses 77 secured in a horizontal position at one end by a frame plate 78 and at their forward-most ends in angle frame brackets 79 suitably secured to the upright main frame supports 12, 13. The product-forming plungers are reciprocally driven by means of crank discs 81, one at each side of the machine, each connected to the crosshead 76 by a crank arm 82. Integral with each crank disc 81 is a gear 83, the discs 81 and gears 83 being carried by a stub shaft 84 each carried by a respective one of the angle frame brackets 79. Extending between angle brackets 79 and journaled therein but disposed below the stub shafts 84 is a shaft 85 carrying near opposite ends thereof of a gear 86 each in driving engagement with one of the gears 83. The shaft 85 at its left-hand end carries a sprocket around which is drawn a chain 87 running to a sprocket mounted near the right-hand end of shaft 36. The shaft 36 is driven from the motor 50 by parts heretofore described, including a chain 56, and thereby serves as means for imparting a driving torque to the shaft 85 and crank discs 81, causing the product-forming plungers 75 to reciprocate in a horizontal plane from a retracted to an actuated position once during each operating cycle of the machine. The product-forming plungers are generally rectangular in configuration, the leading end thereof presenting a rectangular surface for engaging its respective web blank 20a when actuated to push the web blank through an opening in the vertical frame plate 78 and into engagement with edge-folding mechanism hereafter to be described, the action causing each web blank 20a to be impressed with double folds conforming to the top and bottom leading edges of the respective plunger.

Figure 22:
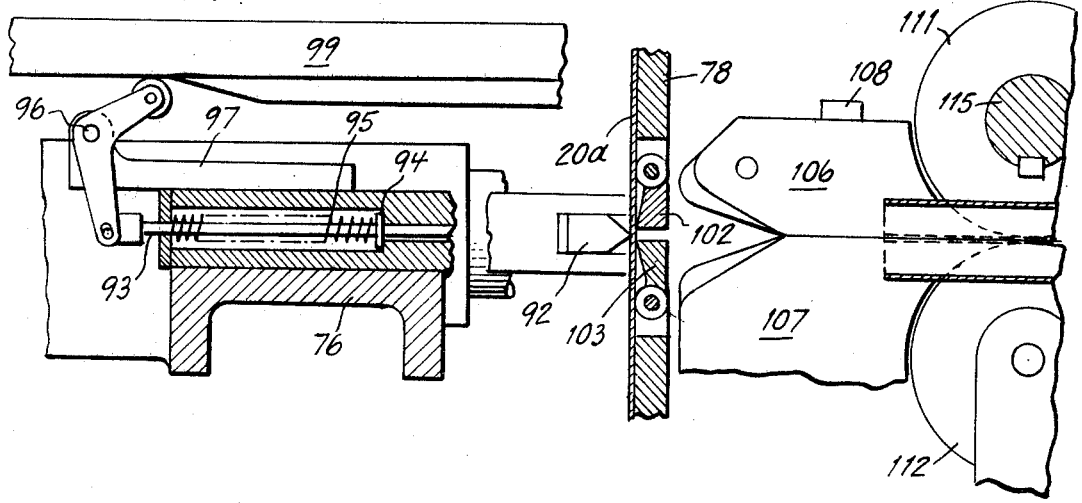
FIG. 22 is a sectional view through one of the pouch-forming plungers showing the plunger in the same partly actuated position as shown in FIG. 19.
Figure 23:
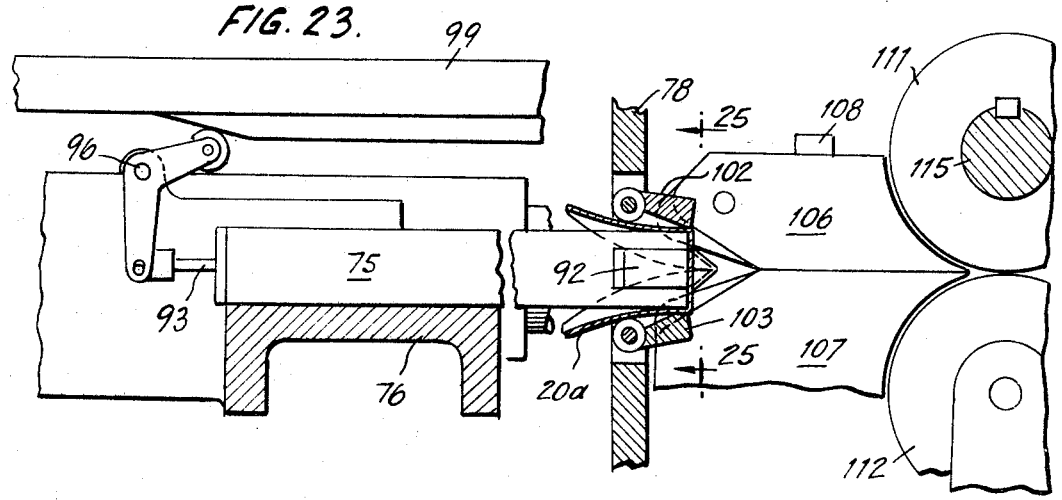
FIG. 23 is a view similar to FIG. 22 illustrating the plunger in the further actuated position of FIG. 20.
Figure 24:
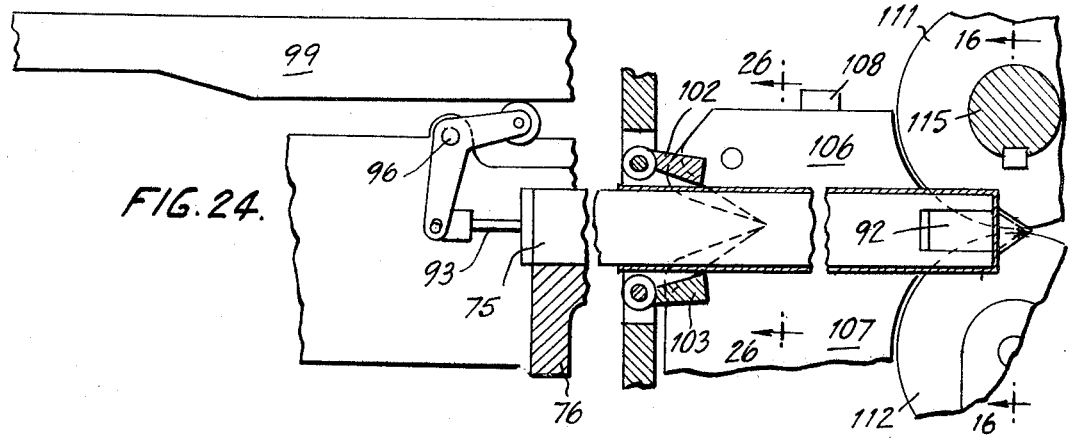
FIG. 24 is a similar view showing the plunger in its fully actuated position, the same position as shown in FIG. 21.

As can be best seen in the detailed view of FIG. 19, each punch-forming plunger is provided with interior cavities for accommodating a pair of tucking fingers 91, 92 and actuating linkage therefor, the tucking fingers normally projecting angularly and laterally of the leading end of the plunger. Each tucking finger 91, 92 comprises an arm of a bellcrank, the other arm of which is pivotally connected to a rod 93 fitted with a collar 94 and spring 95, the collar seating against a step in the cavity of the plunger under influence of the spring 95. Each of the rods 93 at its end is connected to the depending arm of a bellcrank 96 pivoted to a bracket 97 mounted on the plunger, the other end of said bellcrank carrying a follower roller 98 yieldably urged under influence of spring 95 into engagement with a cam rail 99. Each cam rail, of which there are six in the present instance, one for each lane of the machine, is mounted on a crossbar 101, see FIG. 1, the crossbar in turn being supported at its ends by the plunger crosshead guides or bosses 77. In operation, as the plunger 75 is actuated to engage its associated web blank 20a, the cam rail acting on roller 98 causes the tucking fingers 91 to close inwardly to a position wherein they lie flush with the sides of the plunger, the position shown in FIG. 21. In so doing, the tucking fingers 91, 92 gather in the portion of the blank lying between the top and bottom fold lines and extending beyond the sides of the pouch-forming plunger to form out of this portion of the blank a triangular-shaped gusset flap 20b. This gusset flap projects forwardly of the remaining portion of the web blank 20a and has the effect of drawing in the side edges of the blank 20a so that said edges remain straight and parallel with the remaining side edges of the blank 20 as it is progressively draped across and around the sides of the pouch-forming plunger as it advances to its fully actuated position. As aforesaid, each plunger 75 operates to push its respective blank 20a through an opening in the vertical frame plate 78. Mounted in each of said openings are top and bottom smoothing fingers 102, 103 acting as normally closed, yieldably biased gates, best seen in FIGS. 22–24, which swing open by the force of the actuated plunger, and in so doing serve to press or iron down the web blank 20a against the top and bottom surfaces of the plunger as it traverses said opening in the plate 78.

Figure 25:
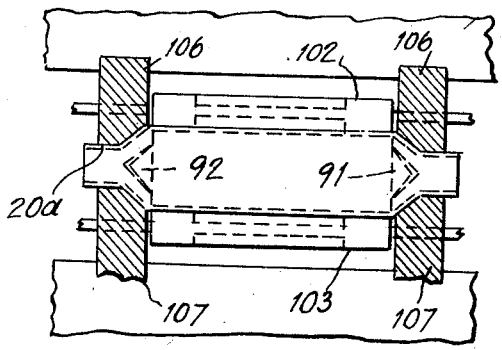
FIG. 25 is a sectional view taken along the line 25—25 of FIG. 23.
Figure 26:
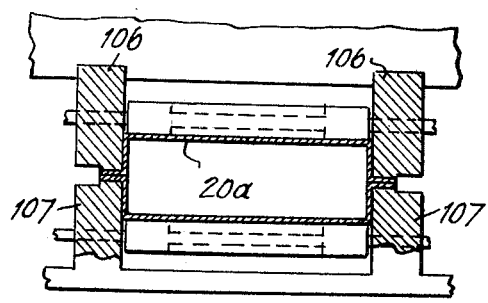
FIG. 26 is a sectional view taken along the line 26—26 of FIG. 24.

The plunger 75, in its continued travel through said opening, enters between a pair of appropriately spaced side edge folders, each pair of folders comprising a top fold plate 106 and a bottom fold plate 107, see also FIGS. 25, 26, which have opposed surfaces yieldably abutting one another to provide a gap accommodating the thickness of two plies of the web blank, the ends of said plates having flared apart surfaces for gathering the side edges of the web blank 20a projecting beyond the sides of the pouch-forming plunger to bring said side edges on both sides of the plunger together while draping said side edges into close conformance with the side surfaces of the plunger. When so draped, the dimensions of the web blank 20a are such that a marginal side sealing area will remain, which sealing area is confined to the gap between the top and bottom folders 106, 107 to thereby result in shaping said blank into a rectangular pouch with abutting side edges projecting laterally at right angles thereto.

Each of the upper side edge folders 106 is pivotally mounted and is biased downwardly by a spring-urged bar 108 laterally traversing each of said folders, into surface contact with its associated lower side edge folder 107 which is fixedly mounted in the machine and is heated, whereby the thermoplastic coating, or hot-melt composition as the case may be, on the interior marginal side edge surfaces of the blank may be elevated to a sufficient temperature while the blank traverses the folding members so as to enable the side edges to be sealed together under application of suitable pressure immediately following the passage of the blank through the folding stage.

Figure 16:
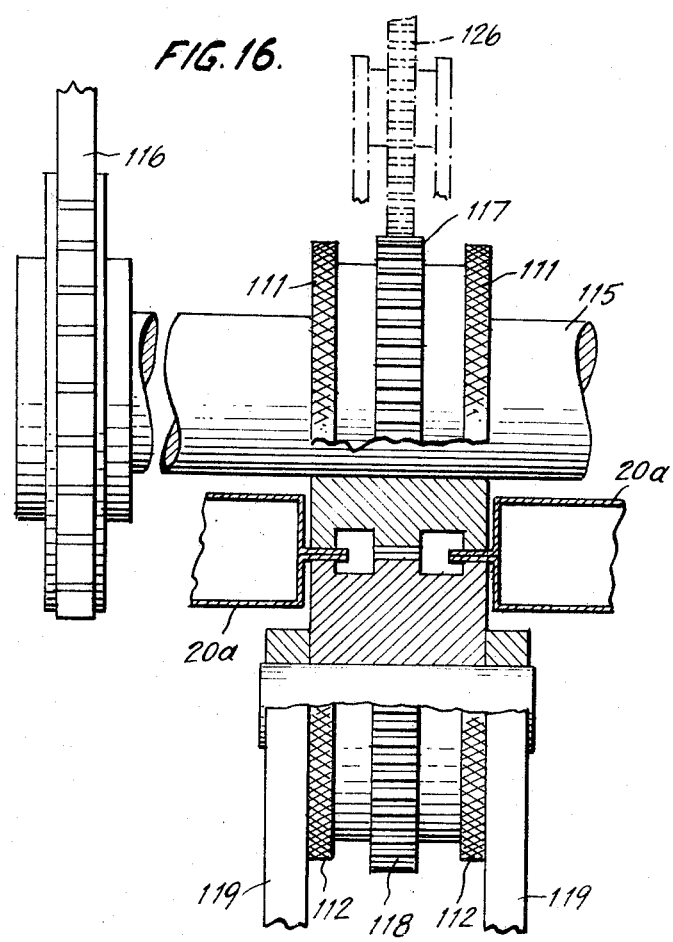
FIG. 16 is a sectional view through the pouch side-seal mechanism taken along the line 16—16 of FIG. 14.
Figure 17:
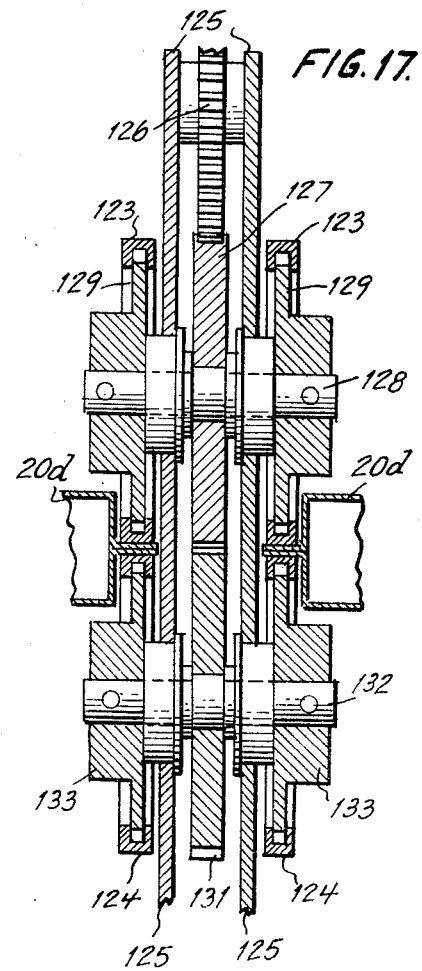
FIG. 17 is a similar view but taken along the line 17—17 of FIG. 14.

The pouch-forming plunger 75 carries the folded blank 20a through the side-edge folders 106, 107 and to the point where the leading portion of the side edges engage in the nip formed by a pair of stripper rolls 111, 112 which continue the advance of the folded pouch and at which time the pouch-forming plunger 75 starts to retract in time to allow for the feeding of the next blank by the accelerating rolls 42, 44 into the pouch-forming station. The stripper rolls 111, 112, in continuing the advance of the pouch, withdraw it from the pouch-forming plunger and at the same time apply pressure to the abutting side edges of the pouch, now in heated condition as aforesaid, to cause said butting side edges to seal together in a firm bond. The upper stripper rolls 111, of which there are twelve in the instant machine, one for sealing each of the two side edges of each blank in each of the six lanes of the machine, are carried by a shaft 115 extending between and journaled in the side frame supports 13, 12, see FIG. 1, the right-hand end of which shaft has a sprocket around which is wrapped a chain 116 running to a sprocket mounted on the right-hand end of shaft 38, see also FIG. 5. As can be best seen in FIG. 16, two adjacent stripper rolls 111, of which one is effective on the right-hand edge seam of one blank and the other is effective on the left-hand edge seam of the blank in the adjacent lane, are mounted on a common hub in view of the close spacing requirements of the machine, which hub also carries a gear 117. Likewise, the two adjacent lower stripper rolls 112 cooperating therewith are mounted on a common hub which also includes a gear 118 in mesh with and driven from the gear 117. In this manner, both the upper stripper roll 117 and lower stripper roll 112 are positively driven, the lower stripper roll assembly being carried by a U-shaped frame 119 which is biased upwardly by an adjustably tensioned spring 121 so as to enable adjustment of the pressure between the respective stripper rolls 111, 112.

Figure 18:
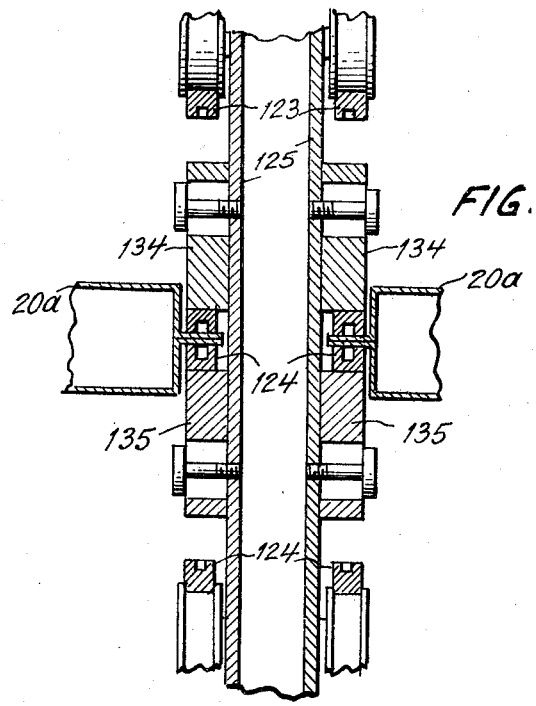
FIG. 18 is a similar view but taken along the line 18—18 of FIG. 14.

The stripper rolls advance the blank now formed into a pouch to a point where the side seams of each pouch are engaged between a pair of conveyor belts 123, 124. Two upper belts 123, as well as two lower belts 124, are mounted in an assembly, see FIGS. 14–18, disposed between adjacent lanes so as to support the belts engaging the left-hand seam of one pouch and the right-hand seam of a pouch in an adjacent lane. Said assemblies include supporting plates 125 between which is mounted a drive gear 126 meshing with gear 117 of a stripper roll assembly, the gear 126 driving a gear 127 supported on a shaft 128 mounted in the plates 125, which shaft 128 carries a pair of drive pulleys 129 for the upper belts 123. The gear 127 is disposed in meshing engagement with a gear 131 mounted on a shaft 132 which supports drive pulleys 133 for driving the lower belts 124. Said assembly also includes upper and lower belt guide rails 134, 135, see FIG. 18, adjustably secured to the support plates 125 of the assembly. Also included in the assembly are driven pulleys 136 for the upper belts 123 and driven pulleys 137 for the lower belts 124. The belts 123, 124 cooperate to engage with each side seam of the several pouches to advance the pouches through the machine and at the same time to maintain the abutting edges of the pouches constituting the side seams in firm contact for a long enough period for the previously heated coating of thermoplastic material, or hot-melt as the case may be, to cool and solidify so that a firm and strong bond is achieved before the pouch is subjected to further handling by the apparatus.

Figure 18A:
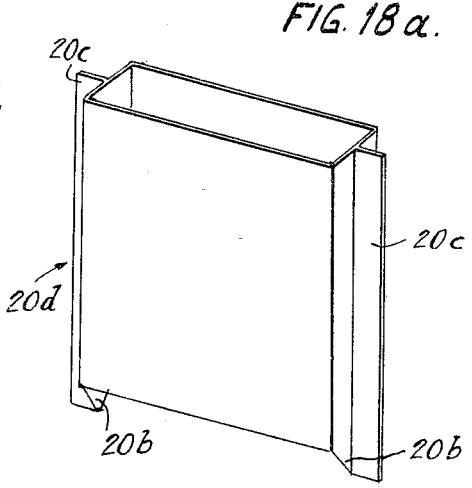
FIG. 18a is a perspective view of a pouch after leaving the side-seal mechanism and in condition for receiving product therein.

FIG. 18a is a view of an individual pouch 20d after being stripped from the pouch-forming plunger and after completion of the side-sealing operation. It will be seen that the pouch structure is one of the gusset type and of substantially rectangular cross section, having a flat bottom, flat front and rear faces, and flat sides, the top of the pouch at this stage of processing being open. Projecting outwardly at right angles to the bottom surface of the pouch are the gusset flaps 20b and projecting outwardly at right angles to the sides of the pouch are the side edge portions of the blank of web material which have been joined together with interior surfaces face-to-face to constitute a fin- or butt-type side seam 20c.

Open-top pouches 20d are delivered by the conveyor belts 123, 124 to an intermittently driven pouch conveyor 140, best seen in FIGS. 1, 1a, 2, 2a. The pouch conveyor includes pairs of conveyor chains 141, there being one pair at each side of the machine, the conveyor chains each being driven by a sprocket 142 mounted on a conveyor drive shaft 143 extending between and journaled in the machine main side frames 10, 11. Each conveyor chain 141 reaches around a driven sprocket 144 mounted on a stub shaft 145 supported by the machine side frames 10, 11. Extending between the opposed pairs of chains 141 and suitably secured to the links thereof are a series of bars 146 arranged in pairs at evenly spaced increments along the length of the chains, each pair of bars having secured thereto upright wall plates 147 arranged at opposed complementary relation to one another to define pouch-receiving pockets, there being six such pockets supported by each pair of the bars 146, one on each pair of bars for each of the six lanes of the machine. It will be noted that the pockets defined by the wall plates 147 are open at their tops, bottoms, and sides, the side openings allowing for the projecting side edge seams 20c to project therethrough. Disposed just below the flights of bars 146 are a series of longitudinally extending pouch-support rails 151 arranged in pairs and underlying the pockets of each lane so as to support the pouches within each of the several pockets. The rails 151 extend along the entire upper reach of the conveyor chains 141, the ends of the rails being curved to follow the curvature of the chains as they reach around the respective sprockets 142, 144, the rails extending from the point of insertion of the pouches into the pockets to the point of ejection of the pouches from the pockets, as will hereinafter be more fully described.

The pouch conveyor is driven intermittently or step-by-step to convey the open-top pouches forward in each lane of the conveyor past first a filling station and then a top-sealing station, the conveyor being driven by means which include a sprocket wheel 153, see also FIG. 5, carried by the right-hand end of shaft 143, said sprocket wheel carrying a drive chain 154 running to a drive sprocket 155 carried by the output shaft of an intermittent drive unit 156 of any suitable type for translating continuous motion into an intermittent motion, such as a Furgeson drive, suitably mounted in the base of the machine. The input shaft to the intermittent drive unit 156 carries a gear 157 in mesh with a gear 158 mounted near the right-hand end of a drive shaft 160. The drive shaft 160, as can best be seen in FIG. 4, extends between and is journaled in the machine side frames 10, 11 and carries at its left-hand end a sprocket 161, see also FIG. 6, around which reaches a chain 162 running to a gear 163 carried by the output shaft 53 of the speed reducer 52. By this drive mechanism, the pouch conveyor is caused to advance each of the pouches 20d in an intermittent or step-by-step manner from the pouch-receiving station at which the pouches are introduced into the pockets of the conveyor in a horizontal attitude. The first movement of the pouches by the conveyor is to turn the pouches into an upright attitude whereupon they advance in step-by-step manner first to a filling station whereat is located a filling spout 165, one for each lane, being part of any suitable filling mechanism, not shown, operating to measure and release product into the open-top pouches 20d while temporarily maintained in filling position directly below the filling spout 165. Each step of movement of the pouch conveyor 140 may be considered to constitute one machine cycle, the driven parts heretofore described being so timed and operated from the common drive as to operate in each lane to form a pouch and transfer same into a pocket of the pouch conveyor 141 during each machine cycle.

The pouches continue to advance with the conveyor 140 in a step-by-step manner toward a top-seal station, the pouches at this stage of travel, of course, containing a measured amount of product which in the present instance is a dry, powdery, free-flowing product. Depending upon the nature of the product, the support rails 151 may at this stage of travel be formed with a stepped or saw-toothed upper surface which would have the effect of jogging the pouches as they feed with the conveyor, causing the product therein to settle into a more densely packed condition.

At the pouch top-seal station is disposed mechanism for closing the open tops of the pouches in each lane and heat-sealing the top edges together so as to completely enclose the product within the pouches. The top-seal mechanism, as can be seen also by reference to FIGS. 8–10, includes a main operating shaft 170 extending across the machine and journaled in the upright frame plates 16, 17 supported by the machine side frames 10, 11, respectively. Mounted on each side of the machine and operated from shaft 170 is identical top-seal-operating mechanism, the corresponding parts of which will be given the same reference numerals in the drawing. Each end of shaft 170 carries a pair of complementary cams 171, 172. Cooperating with each cam 171 is a follower roller 173 carried by the upright arm of a bellcrank 174 mounted on a stub shaft 175 carried by its respective frame plate 16 or 17. A laterally extending arm of the bellcrank is pivotally joined to a pin 176 extending upward through a frame flange 177 and carrying at its upper end a compression spring 178 suitably retained between the flange and a collar secured to the upper end of the pin. Another lower arm of bellcrank 174 is formed with gear teeth meshing with gear teeth on a gear segment 179 formed integral with a rock arm 181 and rotatably mounted on a stub shaft 180 secured to a machine frame plate 16 or 17.

The complementary cam 172 operates similar mechanism including follower roller 183 carried by the upright arm of a bellcrank 184 mounted on a shaft 185, the bellcrank having a laterally extending arm connected to pin 186 carrying a similar compression spring 188. The depending arm of bellcrank 184 is formed with gear teeth meshing with a gear segment 189 formed integral with a rock arm 191 and rotatably supported by stub shaft 180. As will be noted, rotation of the main operating shaft 170 operates through the complementary cams 171, 172 to rock the arms 181, 191 in counter direction to one another, scissors fashion, against the tension of compression springs 178, 188, the arms being rocked towards one another to a closed position by the positive action of the cams and returned away from one another to an open position under influence of the springs 178, 188. Secured to the rock arms 181, 191 at one side of the machine are transverse bars 192, 193, respectively, extending across the machine and connected to corresponding rock arms 181, 191 on the opposite side of the machine. Said bars support at spaced intervals across the machine opposed pairs of sealing jaws 194, 195, there being six such pairs in the present instance, one pair for each lane of the machine. The mechanism operates to maintain the jaws in open position as the open pouches are advanced into the sealing station, and as soon as the pouches come to rest at the sealing station, the jaws are operated by the foregoing mechanism to close and compress the top edges of the pouches together and under the influence of heating elements, not shown, contained in the jaws, to provide a heat-seal bond across the top edge of each pouch. In order to provide a continuous, non-wrinkled seal between the top edges of the pouch, means are provided to stretch each pouch laterally prior to the jaws reaching the closed position. The stretching means, as can best be seen in FIG. 10, includes a pair of pivotally mounted fingers 196, 197 carried by the bottom surface of each of the heat-sealing jaws, said fingers being pivoted at one end thereof to the jaw and carrying at their opposite end a knurled roller 198. The two fingers 196, 197 of each pair are biased by a spring 199 to rotate towards one another and in the open-jaw position are limited by stops 200. As the jaws are rocked to their closed position, the rollers 198 of opposite pairs of fingers, which normally project beyond the sealing face of the jaws, are brought together to grip the laterally projecting side seams 20c of each pouch 20d slightly below the top edge thereof and in so doing cause the open top of the pouch to collapse as the jaws move into their fully closed position. As the rollers 198 of opposite pairs of fingers meet and grip the material of the pouch, the final closing motion of the jaws causes the fingers of each pair to spread apart against the tension of their springs 199 and in so doing causing the rollers 198 to stretch the material of the pouch, thereby avoiding the formation of any wrinkles which might otherwise occur and providing a top seal which extends in a complete and continuous bond across the entire top edge of the pouch.

Main operating shaft 170 for the pouch top-seal mechanism is driven by means which include a chain sprocket 201 mounted at the left-hand end of shaft 170 and around which reaches a drive chain 202, see also FIG. 5. The chain 202 runs around idler sprockets 203, 204 carried by the left-hand stub shafts 185, 175, respectively, and thence reaches about a sprocket 205 carried by the left-hand end of a shaft 210 extending between and journaled inside frames 10, 11. Also carried by shaft 210 at its right-hand end is a sprocket 206 around which reaches a chain 207 running around an idler sprocket 208 and thence to a sprocket 209 mounted on the right-hand end of drive shaft 160, the drive shaft 160 being driven from the motor through the speed reducer by means heretofore described.

From the pouch-sealing station, the pouches 20d in each of the lanes continue to be transported by the conveyor 140 to an eject station where they are transferred from the pockets of the conveyor to cartons which have been prepared to receive them by mechanism hereinafter to be described. The eject station is that stage of travel of the conveyor 140 whereat the pouches are carried approximately 90° around the driven conveyor sprockets 144 so as to assume a horizontal attitude. As the pouches move into the eject station, the laterally projecting side edge seams 20c are engaged by side edge folders 212, see FIGS. 1a, 2a, of which there is a pair for each lane, suitably secured to the framework and disposed to engage the side edge seams 20c and fold them flat against the sides of the pouch preparatory to ejection of the pouch from the conveyor pocket. The pouches are ejected from the pockets by means of eject plungers 215 of rectangular configuration and carried on the ends of rods 216 fitted for sliding movement in a guide bar 217 extending between and secured to the machine side frames 10, 11. The other ends of the rods are secured to a crossbar 218 extending across the machine and slide fitted near its ends in a horizontal slot 219 formed in each of the side frames 10, 11. The crossbar 218, at each end thereof, is pivotally connected by means of a link 221 to an associated rock arm 222, each being carried at one end of a shaft 223 extending across the machine and journaled in the side frames 10, 11. Each rock arm 222 is pivotally connected through a crank arm 224 with crank disc 225, there being one such disc mounted at each end of the shaft 210. The shaft 210 is driven by means heretofore described and, as will be noted, operates through the foregoing linkage to reciprocate the eject plungers 215 which enter the bottom of the open pockets at the eject station to displace the pouches from the conveyor pockets and to insert them into cartons disposed at the bottom of a carton magazine 230. The cartons are supported during their transition from the conveyor pockets to the carton magazine by a shelf 226 formed of the machine framework. Cooperating with the shelf 226 is a deflector 227, see also FIG. 12, yieldably mounted by means of a spring-biased pin 228 and adapted to engage the upper face of each pouch to maintain the pouch in compacted, compressed condition and also to guide it during its transition from the conveyor pocket to the carton magazine. The top of each pin engages a pivotal bail 229 extending across the machine and which activates a machine stop switch, not shown, to avoid a jam whenever a deformed pouch is ejected from the pouch conveyor.

FIGS. 31–33 illustrate a carton of the type which may be utilized for containing the pouches processed by the apparatus. The pouches may be made of any suitable carton material, such as chipboard or the like, which has been folded over upon itself and seamed to form a generally rectangular tubular construction provided with fold lines defining the usual glue flaps 232 and top and bottom closure flaps 233. At least one of the closure flaps 233, best seen in FIG. 32, is formed with a semi-circular cut-out 234, and the cartons are positioned in the magazine with the cut-out flap lowermost. FIG. 31 illustrates the carton in a flattened condition, which is in the condition in which cartons are loaded in the magazine in a series of vertical stacks, one for each lane of the machine. FIG. 32 illustrates the carton in its opened, unflattened condition, which is the condition in which it receives a pouch from the machine. FIG. 33 illustrates the carton in the condition in which it is discharged from the machine after having a pouch inserted therein and after the glue and closure flaps 232, 233 have been folded down and adhered in the folded condition, thus constituting a completely sealed carton in condition for storage or shipment.

The carton magazine 230, see FIGS. 2a, 11–13, 30, comprises an assembly disposed at the rear end of the machine, said assembly including a framework comprised of transverse crossbars 236, 237 near the bottom of the magazine suitably secured to magazine side frames 238, 239. The framework also includes an upper crossbar 241 suitably secured to the upper framework of the machine. Secured at spaced intervals to the crossbars 236, 237 and 241 are a series of spaced plates 242 constituting the side walls of individual carton magazines, one for each lane of the machine, the side edges of the plates being bent at right angles to facilitate their attachment to the crossbars 236, 237 and 241. The plates 242 constituting the magazine walls are spaced apart a distance just sufficient to accommodate the width of cartons 231 when in the flattened condition. Mounted directly below each magazine wall 242 is a camming block 245, best seen in FIG. 13. The top surface of the camming block 245 serves as a limit or rest for the bottom-most carton 231 in each magazine until said bottom-most carton is engaged by carton-opening mechanism, hereinafter to be described. The opposite side surfaces of each camming block 245 taper downwardly and inwardly to provide camming surfaces whereby a flattened carton, when its bottom panel is engaged by the carton-opening mechanism and is pushed downwardly, is forced by the camming surfaces into its opened, squared condition in preparation for receiving a pouch therein. The blocks 245, below their camming surfaces are milled-out to accommodate on one side thereof a spring-biased detent pawl 246 and on the other side thereof a latch pawl 247, also spring biased, which pawls operate to retain the carton in its opened, squared condition while a pouch is inserted therein. The open carton, when engaged by the pawls 246, 247, is retained in a position where it is in registration with the pouch passage defined by the shelf 226 and deflector 227, see FIG. 12. FIG. 12 illustrates a pouch 20d about to be transferred into an open carton 231 by operation of an eject plunger 215, heretofore described. The pouch is inserted to an extent where the line of the pouch top seal registers with the closure flap fold line at the top end of the carton and the bottom flat surface of the pouch registers with the closure flap fold line at the bottom end of the carton, the gusset flaps 20b of the pouch abutting the carton bottom glue flaps to be folded in with the glue flaps during the subsequent carton-sealing operation. The position the pouch occupies in the carton can be seen by reference to the bottom-most carton illustrated in FIG. 12.

The carton-opening mechanism, hereinafter to be described, operates each cycle also to depress each preceding carton, after being filled with a pouch, out of engagement with the pawls 246, 247 and transfer it into engagement with a continuously driven carton discharge conveyor which includes a conveyor chain 251 to which are pivotally attached spring-biased lug 252 which engage a side panel of each of the cartons simultaneously delivered thereto. A lug directly below a carton being transferred yields to permit completion of the transfer and the next succeeding yields to permit completion of the transfer and the next succeeding lug restores to engage the carton side panel to deliver the carton to a subsequent processing station, such as a case-loader or the like. Associated with the discharge conveyor are appropriate devices, not shown herein but which may be of any conventional design, for tucking in the glue flaps and folding over the closure flaps and sealing same to completely enseal the pouches within the cartons. The discharge conveyor at the end thereof underlying the carton magazine is mounted on the frame table 14 and supported by a bracket 253. The cartons as they are conveyed by the discharge conveyor are supported on a plurality of rails 254, each outer rail having secured therein a side guide 255. Also included in the conveyor mechanism is a chain guide 256. The carton discharge conveyor is driven from the motor 50 of the machine through gearing which includes, as can best be seen in FIG. 4, a gear 257 mounted on shaft 160 and meshing with gear 258 fast on a shaft 259 journaled in the side frame 10. Shaft 259, through a pair of bevel gears drives a shaft 261 running rearwardly and serving as the input to a bevel gear box 262. The output shaft 263 of the bevel gear box is journaled in the side frames 10, 11 of the machine and drive another bevel gear box 264. The gear box 264 drives a shaft 265 upon which is mounted chain sprocket 266. Sprocket 266 is operatively coupled to the discharge conveyor chain 251 by conventional chain and sprocket means, not shown, which imparts a continuous driving motion to the conveyor chain 251, causing it to sweep away filled cartons delivered thereto simultaneously by the carton opening mechanism next to be described.

Figure 27:
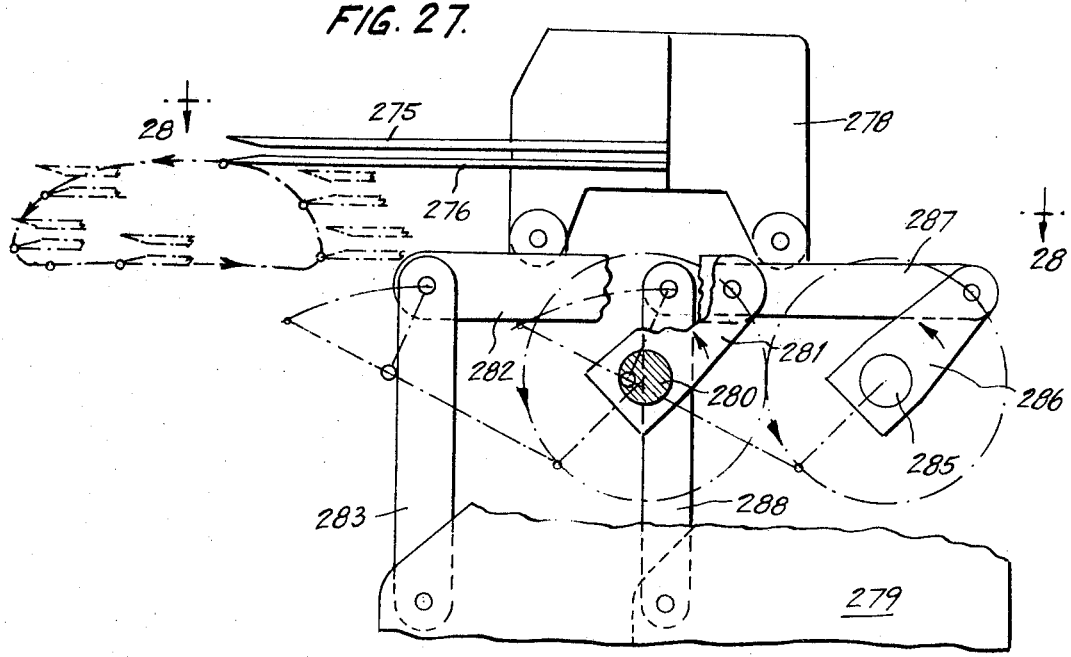
Figure 28:
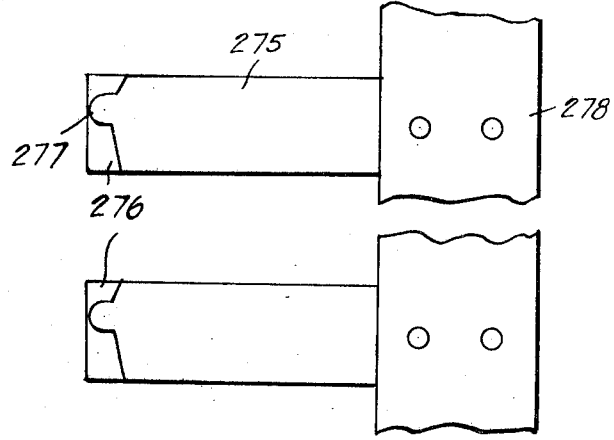
FIG. 28 is a plan view of the mechanism shown in FIG. 27.

The carton-opening mechanism, as can best be seen in FIGS. 1a, 2a, 27, 28, includes for each lane of the machine a pair of horizontally supported blades or paddles 275, 276 superposed in relation to one another and spaced apart to accommodate at least the thickness of the carton material. The top blade 275 may be considered the carton-opening blade, and the blade 276 a carton-discharge blade. The free, unsupported ends of the blades are bevelled to provide a rather narrow leading edge, a side edge of blade 275 also being bevelled to conform to the outline of a flattened carton within the magazine. Also, as can be best seen in FIG. 31, the free leading edge of blade 275 is formed with a semi-circular projection 277 which is disposed to register with the semi-circular cut-out 234 in the lower closure flap 233 of the cartons when stacked in the associated magazine. The radius of projection 277 is somewhat smaller than that of cut-out 234. The blades 275, 276 are supported on a crosshead 278 extending across the machine and connected at each side of the machine to a four-bar linkage which is driven to cause the crosshead 278 and blades supported thereby to execute an orbital movement within a vertical plane, the forward operative strokes of the movement, as can best be seen in FIG. 27, describing a parabolic curve, the return stroke in completing said orbit being substantially straight and horizontal. The four-bar linkages at each end of the crossbar 278 are identical to one another and the one located at the left-hand side of the machine is illustrated in FIGS. 2a and 27. Said linkage is supported in an upright frame plate 279 suitably secured to the frame table 14, the frame plates at each side of the machine supporting a shaft 280 extending therebetween. Mounted on each end of the shaft 280 is a crank arm 281 pivotally connected to one end of a link 282. The other end of link 282 is pivotally connected to the upper end of an upright link 283, the other end of which is pivotally joined to the frame plate 279. Another shaft 285 mounted in each frame plate 279 alongside and in parallel relation to shaft 280 drives parallel linkage including rock arm 286 connected to one end of a link 287, the other end of which is pivotally connected to upright link 288, the lower end of link 288 being pivotally secured to the frame plate 279. Each of the links 282, 287 is pivotally joined to and supports the crosshead 278 so that upon rotation of shafts 280, 285, the parallel linkage operated thereby will cause the crosshead 278 and blades 275, 276 to execute the type of orbital movement illustrated in the dot-and-dash showing of FIG. 27.

The four-bar linkage is driven by means which includes a sprocket wheel 291 carried near each end of the shaft 280 and a sprocket wheel 292 carried by each of the shaft 285. Reaching around said sprockets, see also FIG. 5, is a chain 293 running to a sprocket 294 carried by a shaft 295 suitably mounted in the machine frames 10, 11. Shaft 295 also carries a sprocket 296 around which reaches a chain 297 running to a sprocket 298 carried by shaft 263, which, as heretofore described, is driven continuously by the machine motor 50.

During about the first half of the inward operative stroke of the blades 275, 276, they follow a rising curve during which time the projection 277 on blade 275 is caused to pass through the cut-out 234 in the closure flap of the lowermost carton of the associated magazine, the continued motion of the blade causing it to penetrate into the collapsed or flattened carton substantially to the other end thereof. The rising motion of the blade continues after the blade has entered the flattened carton and this causes a corresponding rise in all of the remaining cartons stacked and resting upon the lowermost carton of the magazine. At about the mid-point of the inward operative stroke of the blades, they start to descend in a curve, and in so doing the blade 275 bearing on the lowermost panel of the collapsed or flattened carton pushes the lowermost panel downwardly into engagement with the camming surface of the camming blocks 245, causing the carton to open up into a rectangular or square configuration, the blade 275, by the time it reaches the limit of its inward operative stroke, having fully opened the carton and lowered it into the position where it is engaged by the pawls 246, 247 as aforesaid, see FIG. 13.

During the lowering movement of the paddles, the lower paddle 276 operates to press downwardly on the preceding carton which had been held in open condition by the pawls 246, 247, which is the position at which the pouches are loaded into the cartons, the lower blade 276 operating to push said carton from the loading position downwardly to the position where it is delivered to the discharge conveyor mechanism and engaged by the lugs 252 carried by the discharge conveyor chain 251. The return stroke of the blades or paddles 275, 276 is substantially horizontal so that during the return stroke there is no vertical movement imparted to the respective cartons.

From the foregoing, it will be evident that the opening of the lowermost carton in the magazine by the lowering motion of the carton-opening blade 276, as will be evident by reference to FIG. 13 in particular, will result in a lateral shifting of the topmost panel of the carton. That is to say, the side panels of the carton in being cammed from a substantially horizontal to a vertical position by the camming block 245 will cause the uppermost panel of the carton to rise slightly and shift to the left, during which motion it will be frictionally engaging the succeeding carton stacked in the magazine, not shown in FIG. 13. Unless means are otherwise provided, this frictional load on the lowermost carton, resulting from the weight imparted by the carton stack, could be so great as to cause the bottom-most carton to rupture as it is being erected into an opened and squared condition. Accordingly, means are provided to remove the weight of the majority of the cartons in the magazine from the lowermost carton during that time in the cycle when the lowermost carton is being opened by the opening-blade 275. The means for relieving the frictional load on the lowermost carton resulting from the weight of the entire carton stack includes a pair of pressure-applying pads 301, see also FIG. 12, disposed at the front and rear of each of the several magazines at a point slightly above the bottom of the carton stack, said pads being made of any suitable resilient material, such as rubber or the like. Each pad is fastened to an angle bracket 302 by which it is secured to a transverse bail 303. The bails extend laterally across the width of the machine and carry a pad associated with each magazine, the rearmost bail 303 being secured at its ends in bellcranks 304. The other bail 303 is secured at its ends in bellcranks 305. The bellcranks are pivotally secured or mounted in angle brackets 306 which are suitably supported by the side frames 238, 239, respectively, of the carton magazine. Each of the bellcranks 304, 305 has a laterally extending arm extending towards one another and formed at its ends with gear teeth in mesh with one another, whereby the bellcranks are caused to rock about their respective pivots counter-directionally to cause the several pads 301 to rock between an opened and closed position. The two oposed pads 301 associated with each magazine, when in the closed position, engage the edges of the abutting cartons and apply a binding force on the engaged abutting cartons to prevent their weight and the weight of all the remaining cartons thereabove in the magazine from bearing on those cartons disposed below the pads 301. Thus, when the opposed pads 301 of each magazine are in the closed position, the lowermost carton of the magazine supports the weight of only those relatively few cartons disposed below the pressure-applying pads 301, and this weight is insufficient to seriously impair the opening of the lowermost carton, the upper panel of which shifts laterally during the carton-opening operation while in frictional engagement with the next succeeding carton resting thereupon. The means for operating the pressure-applying pads 301 includes a follower roller 307 carried by a horizontal arm of bellcrank 305 and disposed for cooperation with an operating cam 308 carried by a shaft 310. The shaft 310 extends across the machine and is supported at its ends in support brackets 311, see FIG. 2a, secured to the main machine side frames 10, 11, respectively. The cam 308 is effective through the bellcranks 305, 304 for rocking the pads 301 to their open position, the pads being yieldably urged to their closed position by a spring 312 stretched between the bellcrank 304 and an appropriate part of the machine framework, not shown. The timing of the cam 308 in relation to the stroke of the carton-opening blade 275 is such as will permit spring 312 to rock the pads to their closed position as the carton-opening blade 275 starts to lower from the highest point of its effective operating stroke, at which time the lowermost carton in the magazine starts to be pulled down between the camming blocks 245. The pads 301 remain closed for about half of an operating cycle and are positively restored to their open position by cam 308 during the return stroke of the blade 275 after the lowermost carton has been fully opened and pushed down into the grip of the pawls 246, 247. The shaft 310 is driven by means of a sprocket 309 carried by the left-hand end thereof, around which sprocket reaches a chain 313 which, as can be seen in FIG. 2a, runs to a sprocket 314 carried by shaft 210, the shaft 210 being driven by machine motor 50 through drive mechanism heretofore described.

The machine is also provided with means for disabling the operation of the carton-opening blade 275 in the event that through some misoperation of the machine there should fail to be a sealed pouch in the pouch conveyor 140 in any of its respective lanes available for loading into an an open carton. The mechanism, as can be seen in FIG. 2a, includes a pouch detector in the form of a bellcrank 315 disposed to sense the presence of a pouch in the pocket of carrier 140 approaching the loading station where the pouches are transferred into the open cartons. The bell-cranks 315, of which there is one for each lane of the machine, are mounted on pivot rods 316 extending between and secured in the machine frame brackets 311. The lower depending arm of bell-crank 315 is operated to rock cyclically substantially in a vertical direction and is limited in its rocking movement if there is a pouch in the pocket of the pouch carrier at that stage of carrier travel. Rocking motion is imparted to each bellcrank 315 by means of a cam 316 mounted on the shaft 310, the cam cooperating with a follower roller supported in a horizontal arm of the bellcrank. Biased against said horizontal arm of each bellcrank is the actuating pin of a normally open microswitch 317, each switch 317 being mounted on a crossplate 318 secured at its ends to the frame support brackets 311. The cam 316 maintains the the lower depending arm of bellcrank 315 clear of pouches as they move from one position to the next. However, as the pouches come to rest, the bellcrank is released by the cam and rocks clockwise only to the pouch-engaging position shown if there is a pouch in the pouch carrier pocket, but rocks further clockwise if there is no pouch in the carrier pocket. The further rocking of bellcrank 315 is effective for closing the contacts of microswitch 317 to complete a circuit to means effective for disabling the operation of the carton opener 275 associated with the same lane of the machine.

The means for disabling the carton opener includes a solenoid 320, one for each lane of the machine and each and each being mounted on an associated magazine partition wall 242, see also FIGS. 11, 12, The armature of each solenoid is pivotally connected to a vertical link 321 which carries one end of a horizontal pin 322, the other end of which is pivotally supported in a bellcrank 323. The bellcranks 323 are loosely mounted for pivotal movement on a crossrod 324 extending across the magazine and supported at its ends in brackets 325 secured to the magazine frame bar 237. The other arm of each bellcrank 323 pivotally supports a depending finger 326, the lower free end of which is bent slightly upwardly and disposed in a position to be engaged by the carton-opening blade 275 in the early part of its effective stroke as its rises to penetrate the lowermost flattened carton in the magazine. As can be seen in FIG. 29, the extremity of the finger 326 is disposed in registration with the semi-circular cut-out 234 in the carton flap and through which the semi-circular projections 277 of the carton-opening blade passes to penetrate into the respective flattener carton. The free end of finger 326 is rounded with a radius about the same as that for projection 277 and being slightly less than the radius of the cut-out 234. When a solenoid 320 is in its de-energized condition such as shown in FIG. 12, which is its normal condition when a pouch is detected by the associated pouch detector mechanism just described, and there is no circuit completed to the solenoid, the bellcrank 323 is in its most counter-clockwise position, in which position the pivot point for the finger 326 is located at a point which permits the free end of finger 326 to pass through the flap cut-out 234 as a result of the finger 326 being engaged by and rocked clockwise by the carton-opening blade 275 as it rises in its operative stroke to penetrate the lowermost carton in the magazine. When solenoid 320 is energized as a result of a no-pouch condition detected by the pouch senser, the armature solenoid rocks the bellcrank 323 to its most clockwise position, as shown in FIG. 7 wherein the pivot point for the finger 326 is moved closer to the magazine. When in this position, as the carton-opener blade 275 engages the finger 326 on its operative stroke, the finger is now advanced to a point where it is unable to penetrate the flap cut-out 234 with the results that it blocks the entrance of the carton-opening blade 275 into the pouch cut-out, thereby preventing the blade 275 from penetrating the pouch and instead causing it to engage the under surface of the lowermost panel of the bottom carton in the magazine. Consequently, there is no carton opened in such a cycle since there is no pouch in the pouch conveyor ready to be loaded into a carton. However, the continued operation of the discharge blade 276 is effective for lowering the preceding loaded carton from its loading position and delivering it to the discharge conveyor in the manner heretofore described. If on the next cycle a pouch is sensed by the pouch-detector mechanism, the associated solenoid 320 will become de-energized, whereupon the disabling finger 326 will be retracted to a position where it can again penetrate the cut-out 234 in the flap of lowermost carton in the magazine so that the carton-opening blade 275 will again operate in its normal intended manner to open said carton and deliver it in opened condition to the loading position where it can receive a pouch transferred thereto from the pouch carrier 140 in the manner heretofore described.

While there has been shown and described what is considered to be a preferred embodiment of the invention, it is, of course, obvious that various changes in form could be made without departing from the spirit of the invention. It is therefore intended that the invention be not limited to the exact form herein shown and described, nor to anything less than the whole of the invention described as hereinafter claimed.

What is claimed and desired to be secured by Letters Patent is:

1. A packaging machine operative for simultaneously processing blanks of flexible packaging material in a plurality of parallel lanes comprising,
 (a) means for withdrawing a single web of said material from a web supply spool,
 (b) means for laterally severing said web into a succession of web sections,
 (c) means for slitting each said section into a lateral series of disconnected web blanks including one for each said lane and advancing each blank through its respective lane,
 (d) means simultaneously operative in each lane for engaging the respective blanks and folding same into the shape of a gusset-type pouch,
 (e) means simultaneously operative in each lane for sealing the side edges of said pouches,
 (f) conveyor means simultaneously operative in each lane for advancing the respective pouches to a pouch filling station, a pouch top-seal station and a carton loading station in succession,
 (g) a carton magazine for each lane each for retaining a stack of folding cartons in flattened condition,
 (h) means for opening cartons from the respective magazines seriatim and simultaneously presenting them in opened condition to the loading station in each lane, and
 (i) means operative simultaneously in each lane for transferring pouches from said conveyor means to the interior of the opened carton at the respective loading station.

2. The invention according to claim 1 including,
 (a) a continuously driven carton conveyor traversing said plurality of lanes for simultaneously receiving loaded cartons from said loading stations and discharging same from the machine.

3. The invention according to claim 1 including,
 (a) means disposed at said top seal station and simultaneously operative in each of said lanes for sealing together the top edges of said pouches to completely enclose therein product received in said pouches when at said filling station.

4. The invention according to claim 3 wherein each said top-sealing means includes,
 (a) members operative for laterally stretching opposed top edges of a pouch to collapse said edges against one another, and
 (b) sealing jaws operative to press said top edges into sealing engagement when in the stretched condition.

5. The invention according to claim 1 wherein,
 (a) said withdrawing means removes said single web continuously from said supply spool.

6. The invention according to claim 5 wherein,
 (a) the means for advancing said severed web sections operates to accelerate the velocity of said sections above the velocity imparted to said single web by said web withdrawing means.

7. The invention according to claim 1 wherein,
 (a) said web is coated on at least one surface with a heat-sealable substance, and
 (b) said folding means includes heated members engaging the side edges of said pouches for enabling heat-sealing thereof.

8. The invention according to claim 1 wherein,
 (a) said folding means includes a reciprocally driven plunger disposed to engage one surface of an advancing blank, and
 (b) side edge folding members disposed on the opposite side of said advancing blank and spaced apart the width of said plunger, said plunger reciprocating in a plane perpendicular to the plane of said blank and into the space between said folding members to cause said blanks to be folded into a pouch having the configuration of said plunger.

9. The invention according to claim 8 wherein,
 (a) said plunger has a rectangular cross section to thereby form said blank into a pouch having a rectangular cross section.

10. The invention according to claim 9 wherein,
(a) the plunger is provided with tucking means operative for forming a gusset flap in said blank as said plunger pushes said blank toward said side edge folding members.

11. In a packaging machine operative simultaneously in a plurality of parallel lanes for forming a corresponding plurality of pouches out of flexible, heat-sealable packaging material adapted to contain a product,
(a) means for withdrawing a single web of said material from a web supply spool,
(b) means for laterally severing said web into a succession of web sections,
(c) means for slitting each said section longitudinally into a lateral series of disconnected web blanks including one for each lane and advancing each blank through its respective lane,
(d) a pouch-forming plunger for each lane and reciprocally driven to engage one surface of the blank advancing in the respective lane,
(e) blank-folding members disposed on the opposite side of said advancing blank from said plunger and spaced apart the width of said plunger, which width is less than the width of said blank, said plunger during its operative stroke entering the space between said folding members to bring the side edges of said blank into engagement with the folding members, said folding members operating to draw the side edges of said blank together into a butt-type seam and cause said blank to fold into a pouch configuration conforming to the shape of said plunger, and
(f) means for heat-sealing the side edges of said pouch brought together by said folding members while continuing to advance a pouch through its respective lane, said heat-sealing means operating to strip the heat-sealed pouch from the associated plunger.

12. The invention according to claim 11 including,
(a) conveyor means simultaneously operative in each lane for receiving the heat-sealed pouch formed in each lane and conveying said pouch in upright condition to a position for receiving product therein.

13. The invention according to claim 11 including,
(a) means simultaneously operative in each lane for sealing the top edges of said pouches, said conveyor means carrying each pouch, after being filled with product, into position for engagement by said pouch top-edge sealing means.

14. The method of packaging a product in lined cartons comprising the steps of,
(a) withdrawing a single web of flexible packaging material from a web supply spool,
(b) laterally severing said web into a succession of web sections,
(c) slitting each section longitudinally into a lateral series of disconnected web blanks,
(d) folding said blanks into the shape of a gusset-type carton liner,
(e) sealing the side edges of said liners,
(f) filling said liners with product,
(g) sealing the top edges of said liners, and
(h) inserting said filled and sealed liners into opened cartons disposed at carton loading stations, said folding, sealing, filling and inserting steps being effected relative to all the web blanks of said series while said blanks proceed in parallel relative to one another along respective processing lanes.

15. The invention according to claim 14 including the steps of,
(a) opening folding cartons stacked in folded condition in a magazine associated with each loading station, and
(b) transferring said opened cartons to said loading stations in time to receive therein said filled and sealed liners.

16. The invention according to claim 15 including the steps of,
(a) removing a loaded carton from said loading station while transferring opened cartons thereto, and
(b) discharging said loaded cartons continuously along a lane extending transversely to each of said processing lanes.

17. The invention according to claim 14 wherein,
(a) said single web of packaging material is withdrawn continuously and at a uniform velocity from said web supply spool, and
(b) said web sections are accelerated to a velocity exceeding that at which said single web is withdrawn from said supply spool.

18. The invention according to claim 14 wherein said packaging material has a surface coated with a heat-sealable substance and wherein,
(a) sealing the side edges of said liners is accomplished while subjecting said side edges to the influence of heat and pressure.

19. The invention according to claim 14 wherein
(a) the sealing of the top edges of said liners is accomplished while said top edges are maintained in a laterally stretched condition.

20. The invention according to claim 19 wherein said packaging material has a surface coated with a heat-sealable substance and wherein,
(a) the sealing of the top edges of said liners is accomplished under the influence of heat and pressure.

21. The invention according to claim 14 wherein,
(a) the folding of said blanks includes the forming of a gusset flap on said carton liner.

22. The method of forming a gusset-type carton liner out of a rectangular blank of flexible packaging material comprising the steps of,
(a) conveying said blank perpendicularly into the path of a rectangular forming plunger having rectangular cross sectional dimensions less than the dimensions of said blank and reciprocally driven to engage during its forward stroke a central area of said blank,
(b) folding over said blank against the top and bottom surfaces of said plunger to divide said blank into top and bottom sections disposed in parallel planes with each section joined along a fold line to a leading blank section disposed along the leading end surface of said plunger,
(c) tucking the opposed sides of said leading blank section extending laterally beyond said plunger into forwardly projecting gusset flaps spaced apart the width of said plunger by folding said opposed sides while advancing said leading blank section, and
(d) drawing together the side edges of said blank while folding the opposed sides of said top and bottom blank sections extending laterally beyond said plunger against the respective side surfaces of said plunger.

23. The invention according to claim 22 wherein one surface of said blank has a coating at least along its side edges of a heat-sealable substance and including the step of,
(a) sealing the drawn-together side edges of said blank under the influence of heat and pressure.

References Cited

UNITED STATES PATENTS 3,041,941   7/1962   Danielzig _____ 53—29 X

FOREIGN PATENTS 562,487   5/1957   Italy.

THERON E. CONDON, Primary Examiner

E. F. DESMOND, Assistant Examiner

U.S. Cl. X.R.

53—29, 173, 183; 93—35